(12) United States Patent
Yamakita et al.

(10) Patent No.: US 6,762,816 B1
(45) Date of Patent: *Jul. 13, 2004

(54) LIQUID CRYSTAL DISPLAY WITH SPECIAL ELECTRODE CONFIGURATIONS AND COMPOSITIONS AND METHOD FOR PRODUCING THE SAME

(75) Inventors: Hiroyuki Yamakita, Osaka (JP); Katsuhiko Kumagawa, Osaka (JP); Kazuo Inoue, Osaka (JP); Akinori Shiota, Osaka (JP); Ichiro Sato, Kyoto (JP); Hiroshi Satani, Kyoto (JP); Masanori Kimura, Osaka (JP); Satoshi Asada, Ishikawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/009,522

(22) PCT Filed: Jun. 12, 2000

(86) PCT No.: PCT/JP00/03815

§ 371 (c)(1),
(2), (4) Date: Dec. 11, 2001

(87) PCT Pub. No.: WO00/77569

PCT Pub. Date: Dec. 21, 2000

(30) Foreign Application Priority Data

| Jun. 11, 1999 | (JP) | ............................................ 11-164891 |
| Jul. 14, 1999 | (JP) | ............................................ 11-200101 |
| Oct. 26, 1999 | (JP) | ............................................ 11-303662 |
| Feb. 1, 2000 | (JP) | ............................................. 2000-023687 |

(51) Int. Cl.[7] ............................................. G02F 1/1343
(52) U.S. Cl. ........................................ 349/149; 349/106
(58) Field of Search ................................. 349/141, 147

(56) References Cited

U.S. PATENT DOCUMENTS

| 5,852,485 | A | * | 12/1998 | Shimada et al. | ............. 349/141 |
| 5,886,762 | A | | 3/1999 | Lee et al. | ..................... 349/141 |
| 5,977,562 | A | * | 11/1999 | Hirakata et al. | ............... 257/72 |
| 6,011,606 | A | * | 1/2000 | Ohe et al. | ..................... 349/141 |
| 6,195,140 | B1 | * | 2/2001 | Kubo et al. | ..................... 349/44 |
| 6,266,118 | B1 | * | 7/2001 | Lee et al. | ..................... 349/141 |
| 6,288,763 | B1 | * | 9/2001 | Hirota | ......................... 349/141 |
| 6,310,674 | B1 | * | 10/2001 | Suzuki et al. | ............... 349/106 |
| 6,337,726 | B1 | * | 1/2002 | Kawano et al. | ............. 349/141 |
| 6,414,729 | B1 | * | 7/2002 | Akiyama et al. | ........... 349/141 |

FOREIGN PATENT DOCUMENTS

| JP | 7-128683 | 5/1995 |
| JP | 9-61836 | 3/1997 |
| JP | 9-146125 | 6/1997 |
| JP | 10-10556 | 1/1998 |

* cited by examiner

*Primary Examiner*—Tarifur R. Chowdhury
*Assistant Examiner*—Timothy Rude
(74) *Attorney, Agent, or Firm*—McDermott, Will & Emery

(57) ABSTRACT

A liquid crystal display comprises an array substrate in which a common electrode, a pixel electrode, a scanning signal line, a video signal line and a semiconductor switching element are provided, an opposed substrate, and a liquid crystal layer interposed between the array substrate and opposed substrate. The line width of at least either the common electrode or the pixel electrode is larger than the distance between the common electrode and the pixel electrode. The film thickness of at least one of the common electrode and the pixel electrode is larger than the thickness of at least either the scanning signal line or the video signal line. As a result, an inplane electric field liquid crystal display having a wide viewing angle, high-speed response, and high image quality such as high luminance is provided.

6 Claims, 24 Drawing Sheets

(a)

(b)

(a)

(b)

(a)

(b)

LIQUID CRYSTAL DISPLAY WITH SPECIAL ELECTRODE CONFIGURATIONS AND COMPOSITIONS AND METHOD FOR PRODUCING THE SAME

TECHNICAL FIELD

The present invention relates to a liquid crystal display and a fabrication method thereof. More particularly, the present invention relates to a liquid crystal display which provides a wide viewing angle and a high-speed response and a fabrication method thereof.

BACKGROUND ART

First Background Art

FIGS. 23(a)(b) are side cross-sectional views showing an operation of a liquid crystal in the conventional liquid crystal panel and FIGS. 23(c)(d) are front views thereof. In FIG. 23, an active element is omitted. Here, part of one pixel is shown, although a plurality of pixels are formed by stripe-shaped electrodes.

FIG. 23(a) is a side cross-sectional view showing a cell in the state in which no voltage is applied and FIG. 23(c) is a front view thereof. Line-shaped electrodes 103, 104 are formed on an inner surface of one of a pair of transparent substrates and an alignment control layer 106 is applied thereon and has been subjected to alignment treatment. A liquid crystal composition is interposed between the substrates. While no voltage is applied, bar-shaped liquid crystal molecules 105 are oriented to have a certain angle with respect to the longitudinal direction of a stripe-shaped Y electrode, i.e., 45 degrees $\leq |\phi Lc| < 90$ degrees ($\phi Lc$: an angle with respect to a long axis (optical axis) of liquid crystal molecules in the vicinity of interfaces). Here, it is assumed that an orientation direction of the liquid crystal molecules on upper and lower interfaces is parallel, and dielectric anisotropy of the liquid crystal composition is positive.

Subsequently, when an electric field 109 is applied, as shown in FIGS. 23(b), (d), the liquid crystal changes its direction according to the electric field. By placing a polarizer 102 at a predetermined angle 108, light transmittance can be varied by application of a voltage Thus, display with contrast is realized without a transparent electrode.

However, in such an In-Plane Switching type liquid crystal display, a response of a nematic liquid crystal to the electric field is slow. In addition, as shown in FIG. 23, since the electrode has a peculiar structure such as the strip shape and it is difficult that the electric field is applied to the liquid crystal, the response speed is low.

Rise time $\tau$rise and Fall time $\tau$fall of the liquid crystal of the In-Plane Switching type are represented by the following expressions disclosed in Japanese Laid-Open Patent Publication No. Hei. 7-225388:

$$\tau\text{rise} = \gamma 1/(\in 0 \Delta \in E^2 - \pi^2 K2/d^2) \quad (1)$$

$$\tau\text{fall} = \gamma 1 d^2/\pi^2 K2 = \gamma 1/\in 0 \Delta \in E^2 \quad (2)$$

where $\gamma 1$ is viscosity coefficient, K2 is elastic constant of twist, d is cell gap, $\Delta \in$ is dielectric anisotropy, $\in 0$ is vacuum dielectric constant, E is electric field strength, and Ec is threshold electric field.

In order to achieve the high-speed response in the In-Plane Switching type liquid crystal display, according to the first and second expressions, the cell gap d is reduced, a liquid crystal material with low viscosity coefficient and high dielectric constant (e.g., cyano-based liquid crystal material) is employed, or a drive voltage is increased to increase an electric field strength E.

However, the following problems remains unsolved in the above-described liquid crystal display.

(1) If the cell gap is reduced, then time required for filling the liquid crystal and hence, time for fabrication are increased. Also, unevenness due to a variation in gap precision is noticeably observed.

(2) When a cyano-based liquid crystal material is used instead of a fluorine-based liquid crystal material or an addition ratio thereof is increased, heat resistance and light resistance become unstable, which might bring about inferior display such as partial abnormality in contrast or flicker.

(3) If the drive voltage is increased, a consumed power is correspondingly increased. Besides, a drive IC which has been conventionally used cannot be used and there is a need for a dedicated drive ID.

(4) If the transparent electrode such as ITO is used as a pixel electrode or a common electrode for the purpose of improvement of the transmittance and response speed, it is necessary to form a layer with larger thickness. But, if the layer is formed so as to be thicker, transmittance is reduced and layer surface is roughened because fine crystals are deposited. For this reason, a light diffusing value is increased and light availability is reduced.

Second Background Art

FIG. 24 is a cross-sectional view showing an In-Plane Switching type liquid crystal display disclosed in Japanese laid-Open Patent Publication No. Hei. 9-236820. As defined herein, the In-Plane Switching is a method in which a pixel electrode and a counter electrode are both formed on an inner surface of one of transparent substrates, potential is given across the pixel electrode and the counter electrode on the same plane, and a lateral electric field parallel to planes in which the transparent substrates respectively exist is applied to the liquid crystal, thereby controlling arrangement of liquid crystal molecules. This method is directed to improving display viewing angle dependency of the display.

FIG. 24(a) shows a cross section in the direction orthogonal to a source bas line (video signal line) and in the vertical direction (direction orthogonal to the substrate surface) of a portion including no semiconductor switching element mentioned later. FIG. 24(b) shows a cross section of the portion including the semiconductor switching element. FIG. 24(c) shows a cross section of the portion in the direction parallel to the source bas line and including the semiconductor switching element.

In FIG. 24, 201a denotes a lower transparent substrate and 201b denotes an upper transparent electrode. 202 denotes a counter electrode. 203a denotes a gate electrode. 204 denotes a source bas line. 205 denotes a pixel electrode and 205a denotes its extended end portion. 206 denotes a semiconductor switching element. 207 denotes a liquid crystal layer. 208a denotes a lower alignment layer and 208b denotes an upper alignment layer. 209 denotes a transparent insulating layer.

As shown in FIG. 24, in this liquid crystal display, the two transparent substrates 201a, 201b are placed opposite to each other, the liquid crystal is filled between opposed surfaces thereof, and alignment layers in contact with the upper and lower surfaces of the liquid crystal layer are adapted to align the liquid crystal molecules to have a predetermined orientation, which has been conventionally adopted.

The characteristics of this display are as follows. A transparent insulating layer 209 is placed between the alignment layer 208a and the transparent substrate 201a on the side of the array substrate, i.e., the transparent substrate on which the electrode is formed, which corresponds to the substrate 201a in this display. The transparent insulating layer serves to insulate between the source bas line and the counter electrode and between the source bas line and the pixel electrode. In addition, the counter electrode and the source bas line can overlap with each other when seen from a user of this display (when the user of this display sees a display screen).

This constitution enables an area of a light-blocking portion due to the existence of the electrode to be reduced and an aperture ratio of the pixel portion to be increased. Consequently, luminance of the entire screen is improved.

However, the following problems exists in this liquid crystal display.

(1) When the pixel electrode and the counter electrode formed in the pixel portion are comprised of non-transparent conductive layers, light is not transmitted through these electrodes, thereby causing the aperture ratio to be decreased. On the other hand, even if the pixel electrode and the counter electrode are comprised of the transparent conductive layers, the electric field strength over the electrodes is small when the conventional electrode constitution and liquid crystal material are employed. Since little light is transmitted, a substantial improvement of the aperture ratio is unfulfilled.

(2) By forming the gate electrode (scanning signal line) and the counter electrode through the same process, the fabrication process can be simplified. Nevertheless, since the respective electrodes are in close proximity with each other, they are electrically shortened, thereby causing a reduced yield ratio.

(3) The counter electrode located right above the source bas line (video signal line) affects an electric field distribution formed by most of counter electrodes other than the counter electrode provided right above the source bas line (video signal line) and the pixel electrode.

(4) Since the electric field distribution formed by the counter electrode located right above the source bas line and the pixel electrode differs from the electric field distribution formed by the other counter electrodes and pixel electrodes, this causes the luminance nonuniformity or coloring.

DISCLOSURE OF THE INVENTION

An object of the present invention is to provide a liquid crystal display which provides a wide viewing angle, a high speed response, and a high mage quality such as high luminance without changing a liquid crystal material, reducing cell gap, or increasing a drive voltage, and a fabrication method thereof.

To achieve the above-described object, the invention according to claim 1 is a liquid crystal display comprising an array substrate in which a common electrode, a pixel electrode, a scanning signal line, a video signal line, and a semiconductor switching element are formed, an opposed substrate, and a liquid crystal layer interposed between the array substrate and the opposed substrate, wherein a voltage is applied across the pixel electrode and the common electrode to generate an electric field substantially parallel to the substrates to thereby drive the liquid crystal to control light, characterized in that line width of at least one of the common electrode and the pixel electrode is larger than gap between the common electrode and the pixel electrode.

By setting the line width of the electrode larger than the gap between the common electrode and the pixel electrode (electrode spacing), the electrode spacing is made substantially smaller. As a result, since the rising of the electric field spreads to the electrode inner side and the electric field strength in the vicinity of the the end of the electrodes is increased, the response speed is improved.

In the present invention, film thickness of at least one of the common electrode and the pixel electrode may be larger than film thickness of at least one of the scanning signal line and the video signal line.

Also, in this way, since the rising of the electric field spreads to the electrode inner side, response speed is improved.

In the present invention, line width of at least one of the common electrode and the pixel electrode may be larger than gap between the common electrode and the pixel electrode, and film thickness of at least one of the common electrode and the pixel electrode may be larger than film thickness of at least one of the scanning signal line and the video signal line.

This constitution provides a synergetic effect greater than the effect obtained by addition of the effect resulting from increasing of the line width and the effect resulting from increasing of the film thickness.

In the present invention, at least one of the common electrode and the pixel electrode may be comprised of a transparent conductive layer.

As described above, by reducing the electrode spacing or increasing the thickness of the electrode, the electric field spread to the region over the electrodes. Therefore, by using the transparent electrode instead of the non-transparent electrode, the portions located right above the electrodes can be used as a display portion. Consequently, transmittance can be improved.

In the present invention, at least one of the common electrode and the pixel electrode may be comprised of at least two types of conductive layers.

In the present invention, at least one of the common electrode and the pixel electrode may be comprised of transparent conductors having at least two types of different optical characteristics.

In the present invention, at least one of the common electrode and the pixel electrode may be comprised of an insulating layer and a conductive layer formed on a surface thereof.

In the present invention, at least one of the common electrode and the pixel electrode may be comprised of a transparent insulating layer and a transparent conductive layer formed on a surface thereof.

In the present invention, electrode gap between the common electrode and the pixel electrode may be at least smaller than gap between the array substrate and the opposed substrate.

In the present invention, part of or all of the common electrode and the pixel electrode may be comprised of amorphous transparent conductive film. The film thickness of the transparent conductive film may be 1500 Å or more.

At least one of the array substrate and the opposed substrate may be made of resin.

The present invention is a method for fabricating a liquid crystal display in which at least part of a common electrode and a pixel electrode is comprised of an amorphous transparent conductive film, characterized in that the transparent conductive film is formed at 100° C. or less.

The transparent conductive film may be formed by adding $H_2O$ or $H_2$ and without heating The present invention is a liquid crystal display comprising an array substrate in which a common electrode, a pixel electrode, a scanning signal line, a video signal line, and a semiconductor switching element are formed, an opposed substrate, and a liquid crystal layer interposed between the array substrate and the opposed substrate, wherein a voltage is applied across the pixel electrode and the common electrode to generate an electric field substantially parallel to the substrates to thereby drive the liquid crystal to control light, characterized in that at least one of the common electrode and the pixel electrode is comprised of a wiring portion and an electrode portion formed in different layers with an insulating layer interposed therebetween, and the electrode portion is comprised of a transparent conductive layer.

By thus forming the electrode portion using the transparent conductive layer, the transmittance can be made higher than that of the conventional example in the liquid crystal display with layered pixel electrode and common electrode.

The wiring portion of the common electrode may be formed in the same process as the scanning signal line. The wiring portion of the pixel electrode may be formed in the same process as the video signal line.

One of or both of line width of each of electrode portions constituting the common electrode and the pixel electrode and spacing between the electrode portion of the common electrode and the electrode portion of the pixel electrode may be substantially equal to or smaller than gap between the array substrate and the opposed substrate.

Also, line widths of the electrode portions comprised of transparent conductive layers are not limited to the line widths of the electrode portions formed using the non-transparent conductive layers and may have different values. In particular, it is preferable that line widths of the electrode portions comprised of transparent conductive layers are larger than line widths of the electrode portions comprised of non-transparent conductive layers. In this way, the transmittance can be increased.

The present invention is a liquid crystal display comprising an array substrate in which a common electrode, a pixel electrode, a scanning signal line, a video signal line, and a semiconductor switching element are formed, an opposed substrate, and a liquid crystal layer interposed between the array substrate and the opposed substrate, wherein a voltage is applied across the pixel electrode and the common electrode to generate an electric field substantially parallel to the substrates to thereby drive the liquid crystal to control light, characterized in that part of the common electrode and the video signal line are a layered common electrode and a layered video signal line which are layered with an insulating layer interposed therebetween such that patterned positions thereof are overlapped with each other when seen from a direction orthogonal to a surface of the substrate, and one of or both of line width of each of electrode portions constituting the common electrode and the pixel electrode and gap between the electrode portion of the common electrode and the electrode portion of the pixel electrode is substantially equal to or smaller than gap between the array substrate and the opposed substrate.

In the present invention, at least one of the layered electrodes may be comprised of the wiring portion and the electrode portion and the electrode portion may be comprised of a transparent conductive layer.

The layered electrode may be comprised of the wiring portion and the electrode portion, and the wiring portion may be formed in the same process as the scanning signal line or the video signal line.

Also, a layer including the electrode portion of the layered common electrode that is located right above the layered video signal line may be comprised of a non-transparent conductive layer.

Also, a layer including the electrode portion of the layered common electrode that is located right above the layered video signal line may be different from a layer in which the other common electrodes are formed.

At least one of the layered common electrode and the layered pixel electrode may be formed on the insulating layer on the side of the array substrate.

The present invention is a liquid crystal display comprising an array substrate in which a common electrode, a pixel electrode, a scanning signal line, a video signal line, and a semiconductor switching element are formed, an opposed substrate, and a liquid crystal layer interposed between the array substrate and the opposed substrate, wherein a voltage is applied across the pixel electrode and the common electrodes to generate an electric field substantially parallel to the substrates to thereby drive the liquid crystal to control light, characterized in that part of the common electrode and the video signal line are a layered common electrode and a layered video signal line which are layered with an insulating layer interposed therebetween such that patterned positions thereof are overlapped with each other when seen from a direction orthogonal to a surface of the substrate and line width of the electrode portion of the layered common electrode that is located right above the layered video signal line is different from line width of the electrode portions of the other common electrodes.

In the present invention, the line width of each of the electrode portions constituting the common electrode and the pixel electrode may allow liquid crystal molecules over the electrode portion comprised of the transparent conductive layer to be modulated by an electric field generated between the common electrode and the pixel electrode.

The line width of each of the electrode portions constituting the common electrode and the pixel electrode may be less than twice of gap between the array substrate and the opposed substrate.

The line width of each of the electrode portions constituting the common electrode and the pixel electrode may be 39 $\mu$m to 89 $\mu$m.

The dielectric constant anisotropy $\Delta\varepsilon$ of a liquid crystal material of the liquid crystal layer may be +8 or more. Bend elastic constant $K33$ of a liquid crystal material of the liquid crystal layer may be 18(pN) or less. Further, retardation $\Delta n \times d$ of the liquid crystal layer may be 200 nm–600 nm.

The liquid crystal layer may be made of a liquid crystal material having a 35% or less content of the cyano-based compound.

The electrode portions constituting the common electrode and the pixel electrode may be bent so as to include at least one bent portion in a pixel. The video signal line may be bent so as to have a bending angle substantially equal to that of a bending shape of the electrode portions constituting the common electrode and the pixel electrode.

The semiconductor switching element may be a channel etched thin film transistor.

Part of the semiconductor switching element may be made of polysilicon.

The present invention is a method for fabricating a liquid crystal display comprising the steps of: forming a non-transparent conductor on an active matrix substrate and patterning a first electrode group comprised of part or all of a common electrode and a scanning signal line to have a predetermined shape; forming a first insulating layer on the active matrix substrate having the first electrode group; forming a semiconductor layer on a predetermined portion of the first insulating layer; forming a non-transparent conductor on the first insulating layer and the semiconductor layer and patterning a second electrode group comprised of part or all of a video signal line and a pixel electrode to have a predetermined shape; forming a second insulating layer on the active matrix substrate that has been subjected to the step of forming the second electrode group and its previous steps, and forming a transparent conductor on the second insulating layer and patterning a third electrode group comprised of part of the common electrode and/or part of the pixel electrode to have a predetermined shape.

Also, the present invention is a method for fabricating a liquid crystal display comprising the steps of: forming a non-transparent conductor on an active matrix substrate and patterning a first electrode group comprised of part or all of a common electrode and a scanning signal line to have a predetermined shape; forming a first insulating layer on the active matrix substrate having the first electrode group; forming a semiconductor layer on a predetermined portion of the first insulating layer; forming a non-transparent conductor on the first insulating layer and the semiconductor layer and patterning a second electrode group comprised of part of or all of a video signal line and a pixel electrode to have a predetermined shape; forming a second insulating film on the active matrix substrate that has been subjected to the step of forming the second electrode group and its previous steps; forming a transparent conductor on the second insulating film and patterning a third electrode group comprised of part of one of the common electrode and the pixel electrode; forming a third insulating layer on the active matrix substrate that has been subjected to the step of forming the third electrode group and its previous steps; and forming a transparent conductor on the third insulating layer and patterning a fourth electrode group comprised of part of the other of the common electrode and the pixel electrode group to have a predetermined pattern.

The method for fabricating the liquid crystal display may further comprise the step of forming a third insulating layer subsequent to a step of forming the third electrode group to have the predetermined pattern.

The method may further comprise the step of forming a fourth insulating layer subsequent to a step of forming the fourth electrode group to have a predetermined pattern.

In the method for fabricating the liquid crystal display, the third insulating layer or the fourth insulating layer may be made of SiNx-based material, or a photosensitive resin material or an SiO$_2$-based material.

It is preferable that Sb$_2$O$_5$-based fine particles may be added to the SiO$_2$-based material.

BRIEF DESCRIPTION OF THE DRAWINGS

FIGS. 8(a)–8(c) showing a constitution of a liquid crystal display according to an embodiment 2-1, wherein FIG. 8(a) is a cross-sectional view showing the constitution of the liquid crystal display according to the embodiment 1-1, FIG. 8(b) is plan view showing the constitution of the liquid crystal display according to the embodiment 2-1, and FIG. 8(c) is a cross-sectional view taken along line A—A showing the constitution of the liquid crystal display according to the embodiment 2-1;

FIGS. 12(a)–FIG. 12(c) are views showing a constitution of a liquid crystal display according to an embodiments 2-2, wherein FIG. 12(a) is a cross-sectional view showing the constitution of the liquid crystal display according to the embodiment 2-1, FIG. 12(b) is plan view showing the constitution of the liquid crystal display according to the embodiment 2-1, and FIG. 12(c) is a cross-sectional view taken along line A—A showing the constitution of the liquid crystal display according to the embodiment 2-2;

FIGS. 14(a)–FIG. 14(c) are views showing a constitution of a liquid crystal display according to an embodiment 2-3, wherein FIG. 14(a) is a cross-sectional view showing the constitution of the liquid crystal display according to the embodiment 2-3, FIG. 14(b) is plan view showing the constitution of the liquid crystal display according to the embodiment 2-3, and FIG. 14(c) is a cross-sectional view taken along line A—A showing the constitution of the liquid crystal display according to the embodiment 2-3;

FIGS. 17(a)–FIG. 17(b).are views showing a constitution of a liquid crystal display according to an embodiment 2-5, wherein FIG. 17(a) is a cross-sectional view showing the constitution of the liquid crystal display according to the embodiment 2-5, and FIG. 17(b) is plan view showing the constitution of the liquid crystal display according to the embodiment 2-3;

FIGS. 20(a)–FIG. 20(c) are views showing a constitution of a liquid crystal display according to an embodiment 2-6, wherein FIG. 20(a) is a cross-sectional view showing the constitution of the liquid crystal display according to the embodiment 2-6, FIG. 20(b) is plan view showing the constitution of the liquid crystal display according to the embodiment 2-6, and FIG. 20(c) is a cross-sectional view taken along line A—A showing the constitution of the liquid crystal display according to the embodiment 2-6;

FIGS. 21(a)–FIG. 21(c) are views showing a constitution of a liquid crystal display according to an embodiment 2-7, wherein FIG. 21(a) is a cross-sectional view showing the constitution of the liquid crystal display according to the embodiment 2-6, FIG. 21(b) is plan view showing the constitution of the liquid crystal display according to the embodiment 2-6, and FIG. 21(c) is a cross-sectional view taken along line A—A showing the constitution of the liquid crystal display according to the embodiment 2-6;

BEST MODE FOR CARRYING OUT THE INVENTION

First Invention Group

Figure 1:
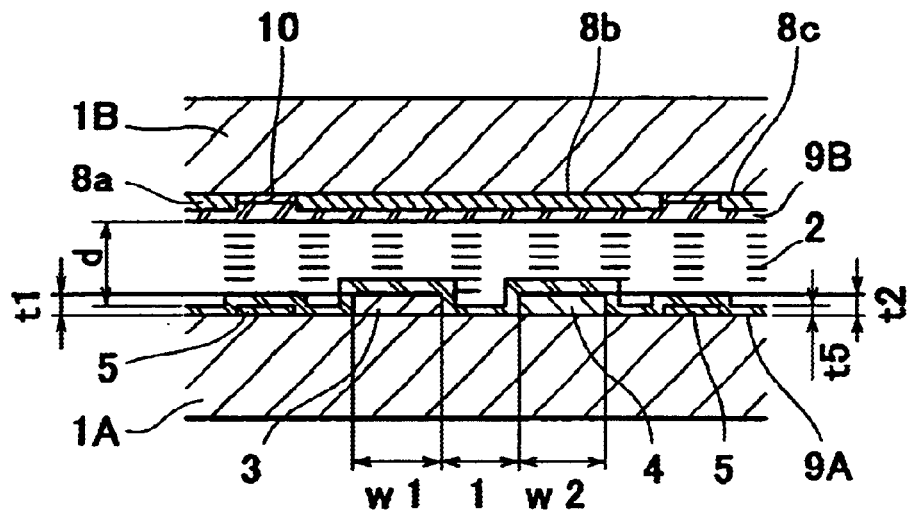
FIGS. 1(a) and FIG. 1(b) are views showing a constitution of a liquid crystal display according to an embodiment 1-1.
Figure 1:
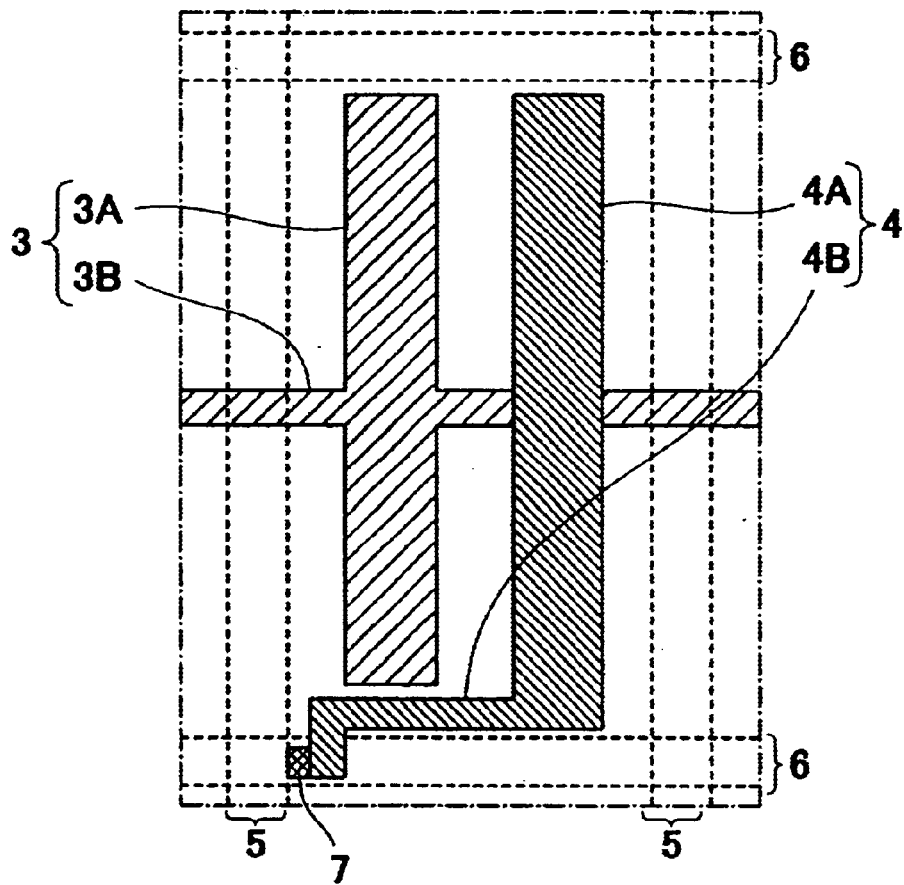

Hereinafter, a first invention group of the present invention will be described with reference to drawings. (Embodiment 1-1)

An embodiment 1-1 of the present invention will be described with reference to Figures.

FIG. 1(a) is a cross-sectional view showing a constitution of a liquid crystal display according to an embodiment 1-1 of the present invention. FIG. 1(b) is a plan view showing the constitution of the liquid crystal display according to the embodiment 1-1 of the present invention.

The liquid crystal display is an IPS (In-Plane-Switching) liquid crystal display. The liquid crystal display comprises an array substrate 1A, an opposed substrate 1B, and a liquid crystal 2 interposed between the array substrate 1A and the opposed substrate 1B.

A red color filter material 8a, a green color filter material 8b, a blue color filter material 8c, and a black matrix 10 are formed to have a predetermined pattern on an inner surface of the opposed substrate 1B. An alignment layer 9B is formed on an inner surface of the color filter materials 8a, 8b, 8c, and the black matrix 10.

The array substrate 1A is provided with a plurality of scanning signal lines 6 and video signal lines 5 that are formed in matrix, a TFT (Thin Film Transistor) 7 as a semiconductor switching placed in the vicinity of intersection of the scanning signal line 6 and the video signal line 5, and a pair of common electrodes 3 and a pixel electrode 4 for generating an electric field (lateral field) parallel to the substrates 1A, 1B. The pixel electrode 4 is comprised of an electrode portion 4A to which a video signal from the video signal line 5 is supplied and a wiring portion 4B. The common electrode 3 is comprised of an electrode portion 3A and a wiring portion 3B. An alignment layer 9A made of polyimide or the like is formed on an inner surface side of the common electrode 3 and the pixel electrode 4.

It should be noted that line width W1 of the common electrode 3 and line width w2 of the pixel electrode 4 are larger than gap 1 between the common electrode 3 and the pixel electrode 4 (indicating spacing between the electrode portion 4A and the electrode portion 3A) (w1, w2>1) and film thickness t1 of the common electrode 3 and the pixel electrode 4 is larger than film thickness t2 of the scanning signal line or the video signal line. Such a constitution can increase a response speed of the liquid crystal. Besides, transmittance can be substantially improved. The reason for the improvement of the response speed and the transmittance will be described in detail later.

Subsequently, a method for fabricating the liquid crystal display of the above constitution will be described in brief. First, the scanning signal lines 6 patterned by a conductive film made of Al or the like are formed on the array substrate 1A, and then an insulating film is formed thereon. Thereafter, the semiconductor switching element 7 made of a-Si or the like and the video signal lines 5 patterned by a conductive film made of Al or the like are formed.

In this embodiment, the In-Plane Switching is adopted. The common electrode 3 and the pixel electrode 4 are formed by pattering an ITO film as a transparent conductor or a conductive film made of Al or the like in comb shape.

Further, the alignment layers 9A, 9B made of polyimide or the like are respectively formed on the array substrate 1A and the opposed substrate 1B to align molecules of the liquid crystal 2. The transparent substrate 1B is opposite to the transparent substrate 1A, and is provided with the red color filter material 8a, the green color filter material 8b, the blue color filter material 8c, and the black matrix 10 to have a predetermined pattern.

The array substrate 1A and the opposed substrate 1B so fabricated respectively have initial predetermined orientation directions. Peripheral portions thereof are bonded by means of a sealing agent and then the liquid crystal 2 is filled, followed by sealing. Thus, the liquid crystal display is fabricated.

A display operation of so fabricated liquid crystal display will be explained. The semiconductor switching element 7 is on/off controlled by a drive signal input through the video signal line 5 and the scanning signal line 6. An electric field is generated by the voltage applied across the pixel electrode 4 connected to the semiconductor switching element 7 and the common electrode 3 to change the orientation of the liquid crystal 2 to thereby control the luminances of the respective pixels, thus displaying an image.

Subsequently, an electrode structure as a main feature of the present invention will be described. In FIGS. 1(a), 1(b), d denotes cell gap, w1, w2 respectively denote widths of the common electrode 3 and the pixel electrode 4. 1 denotes spacing (gap) between the common electrode 3 and the pixel electrode 4. t1 denotes thickness of the common electrode 3. t2 denotes thickness of the pixel electrode 4. t5 denotes thickness of the video signal line 5 and the scanning signal line 6.

With the conventional constitution, as disclosed in Japanese Laid-Open Patent Publication No. Hei. 7-36058, the common electrode 3 is formed using a metal such as Cr or Al-based metal through the same process as the scanning signal line 6, and the pixel electrode 4 is formed using a metal such as Mo or Al-based metal through the same process as the video signal line 5. So, the film thickness of the common electrode 3 formed through the process is equal to that of the scanning signal line 6. The film thickness of the pixel electrode 4 is equal to that of the video signal line 5.

In this embodiment, as shown in FIG. 1, the line width w1 of the common electrode 3 and the line width w2 of the pixel electrode 4 are set larger than the gap between the common electrode 3 and the pixel electrode 4 (w1, w2>1) and the film thickness t1 of the common electrode 3 and the film thickness t2 of the pixel electrode 4 are set larger than the film thickness t5 of the scanning signal line or the video signal line (t1, t2>t5). This is greatly different from that of the conventional example. The present invention is not limited to constitution of w1, w2>1 and t1, t2>t5 but may adopt constitution of only w1, w2>1 or only t1, t2>t5.

Figure 2:
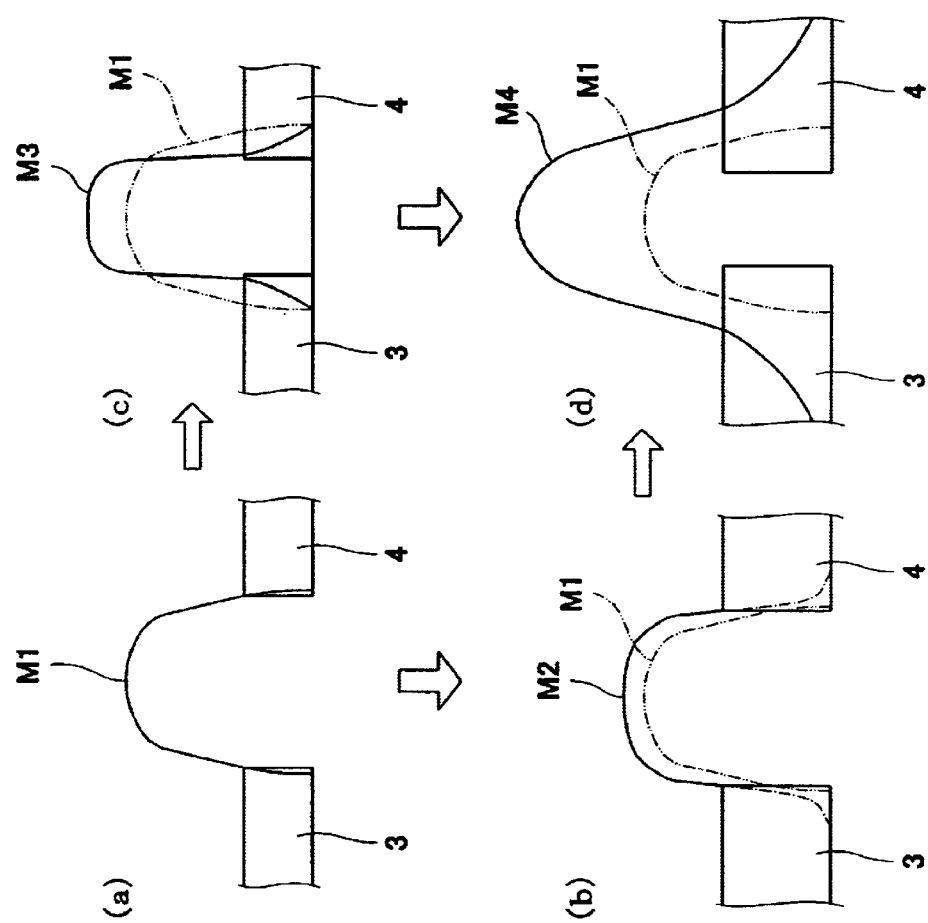
FIGS. 2(a)–FIG. 2(d) are views for explaining a principle of an electrode structure according to the embodiment 1-1.

Such an electrode constitution provides high-speed responsiveness and the use of the transparent electrode as the electrode can improve the transmittance. Hereinbelow, the reason for this will be explained in detail with reference to FIG. 2. In FIG. 2, a curved line indicated by reference numeral M1 denotes the conventional electric field distribution, a curved line indicated by reference numeral M2 denotes an electric field distribution in which only the film thickness is larger, a curved line indicated by reference numeral M3 denotes an electric field distribution in which only the electrode spacing is smaller, and a curved line indicated by reference numeral M4 denotes an electric field distribution in which the film thickness is larger and the electrode spacing is smaller. FIG. 2(a) shows the conventional example and FIG. 2(b) shows the example in which the electrode spacing is equal to that of the conventional example and only the film thickness is larger than that of the conventional example.

By increasing the film thickness, the electric field strength is increased in the vicinity of the electrode edge portion as shown in FIG. 2(b). Thereby, the electric field strength over the electrodes is increased as compared to the conventional example of FIG. 2(a), so that the liquid crystal molecules located immediately on the electrodes can be driven. The electric strength of the conventional example is shown in FIG. 2(a), and herein, only the liquid crystal molecules between the electrodes were capable of being driven and the liquid crystal molecules immediately on the electrodes were not. In the example shown in FIG. 2(b), since the liquid crystal molecules immediately on the electrode can be driven, the transmittance can be improved by using the transparent electrodes as these electrodes. It should be noted that the electric field strength between the electrodes is larger than that of the conventional example. In view of this, the high-speed responsiveness and high transmittance characteristic can be obtained.

FIG. 2(c) shows an example in which the film thickness is set equal to that of the conventional example and only the electrode spacing is reduced. By thus making the electrode spacing smaller than that of the conventional example, the electric field strength between the electrodes becomes larger than that of the conventional example. Further, the electric field strength over the electrodes is large enough to drive the liquid crystal molecules. Accordingly, by reducing the electrode spacing as shown in FIG. 2(c), the electric field strength over the electrodes and between the electrodes can be made lager than that of the conventional example. Therefore, the high-speed responsiveness is achieved. Further, by using the transparent electrodes as the electrodes, the liquid crystal molecules over the electrodes are driven, thereby improving an aperture ratio and substantial transmission. Consequently, also, with the constitution of FIG. 2(c), the high-speed responsiveness and high transmittance characteristic are achieved.

FIG. 2(d) shows an example in which the film thickness is increased and the electrode spacing is reduced. The example of FIG. 2(d) is obtained by adding the constitution of FIG. 2(c) to the constitution of FIG. 2(b). It should be noted that the constitution of FIG. 2(d) is characterized in that a synergistic effect greater than the effect obtained by addition of the effect of reduction of only the electrode spacing to the effect of only the film thickness is obtained. Specifically, the electric field strength over the electrodes and between the electrodes is, as shown in FIG. 2(d), more than the sum of the electric field strength of FIG. 2(b) and the electric field strength of FIG. 2(c). Probably, the reason for this might be that the effect of the electric field strength due to change in the film thickness and the effect of the electric strength due to change in the electrode spacing synergistically act.

The inventors actually fabricated a liquid crystal display having the constitution of FIGS. 2(a)–2(d) based on the above principle and made an experiment.

Specifically, three samples were prepared as samples of this embodiment. In Sample (1), electrode gap 1=6 $\mu$m, electrode width w=10 $\mu$m, cell gap d=4 $\mu$m, t1=t2=0.49 $\mu$m. In Sample (2), electrode gap 1=6 $\mu$m, electrode width w=10 $\mu$m, cell gap d=4 $\mu$m, t1=t2=8000 Å. In sample (4), electrode gap 1=10 $\mu$m, electrode width w=6 $\mu$m, cell gap d=4 $\mu$m, t1=t2=0.4 $\mu$m.

As the conventional sample, Sample (3) was prepared. In sample (3), electrode gap 1=10 $\mu$m, electrode width w=6 $\mu$m, cell gap d=4 $\mu$m, t1=t2=2000 Å.

Figure 3:
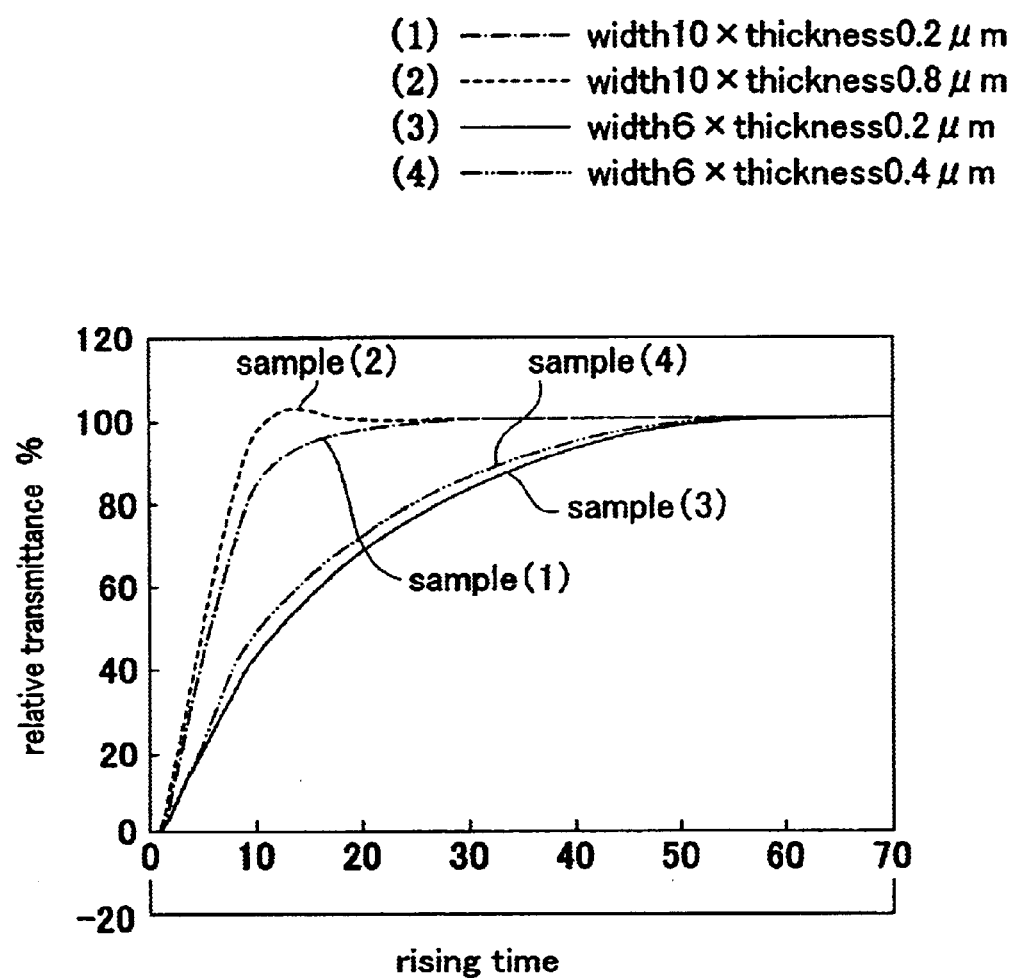
FIG. 3 is a view showing a response characteristic of a liquid crystal display according to the embodiment 1-1.

Response speeds of the samples (1)–(4) were measured under the same conditions, (the same liquid crystal material, the cell gap d=4 $\mu$m, the drive voltage=5V and the same environment except the electrode constitution. FIG. 3 shows measurements of rise times $\tau$rise of the samples (1)–(4), in which a solid line indicates the conventional sample (3), a dashed line indicates sample (1), a dashed line indicates sample (2), and an alternate long and two short dashed line indicates a response characteristic of the sample (4). As can be clearly understood from these measurements, as compared to the conventional sample (3), the rise time of 90% response is reduced to about ⅓ in Sample (1) and about ¼ in Sample (2). So, this embodiment is considered as effective in high-speed response.

For reference, conventionally, the electrode line widths w1, w2 were set smaller than the electrode spacing 1 (w1, w2<1). The reason is as follows. Conventionally, since non-transparent electrodes made of Al or the like are employed as the pixel electrode and the common electrode, it is necessary to set the electrode spacing 1 larger in order to increase the aperture ratio. However, the extent to which the electrode spacing can be increased is limited, because if the spacing 1 is increased to excess, then the response speed becomes low, and the electrode line width in one pixel is determined based on the relationship with the wiring. Accordingly, conventionally, in design, the spacing was increased as much as possible taking electrode conditions such as the electrode line width and the response speed into account. In other words, conventionally, the idea of reducing the electrode spacing has not been proposed. With this regard, the present invention is based on a technical idea of reducing the electrode spacing and essentially differs in technical idea from the conventional example.

Also, the idea of increasing the thickness of the electrode of the present invention has not been proposed in the conventional example. This is because the pixel electrode and the common electrode were formed simultaneously during a production process of the scanning line or the video signal line. For writing of a video signal, it is preferable that the wiring resistance is low and the film thickness of the wiring is therefore small. Accordingly, in the present state, the wiring such as the video signal line is made thin and the thickness of the electrode is corresponding small. In brief, the thickness of the electrode was small like the thickness of the wiring of the video signal line or the like. So, the prior arts do not include the idea of differing the thickness of the electrode and the thickness of the wiring from each,other and essentially differ in technical idea from the present invention in which the thickness of the electrode is varied.

In the above-described example, the common electrode 3 and the pixel electrode 4 are made of the non-tansmissive metal such as Cr or Al-based metal. A case where a transparent electrode such as ITO is used for improvement of the aperture ratio will be described below.

In general, ITO used for the common electrode 3 or the pixel electrode 4 are formed at approximately 200° C. The crystallization temperature of ITO is around 100–200° C. The ITO formed at such temperature is a film in which amorphous and polycrystal coexist. If the film comprising amorphous and polycrystal is used to form a thicker film, then its surface become roughened and a light diffusing value is increased, resulting in reduced light availability. For this reason, the thickness of ITO is generally approximately 700 Å and is considerably smaller than that of the non-transparent metal such as Cr or Al-based metal used for the video signal line 5 or the scanning signal line 6 (film thickness: approximately 1200 Å–2000 Å). Since it is impossible to increase the film thickness of the conventional ITO film for improvement of transmittance, increasing of the film thickness for high-speed response as described above is difficult.

However, when the ITO is amorphous, the surface is smooth. So, even if the film thickness is increased, there is no increase in the light diffusing value and significant reduction in transmittance. In case of the amorphous ITO, to provide a peak of transmittance in the wavelength 550 nm, it is necessary to set the film thickness to approximately 1500 Å. Therefore, to realize improvement of transmittance and high-speed response, the film thickness is preferably set to 1500 Å or larger.

Specifically, when the amorphous ITO is used, the high-speed response effect is obtained as compared to the conventional ITO film with the film thickness (approximately 1200 Å–2000 Å) almost equal to the thickness of the non-transparent metal such as CR or Al-based metal used for the video signal line 5 or the scanning line 6. Of course, if the amorphous, ITO is made larger than the video signal line 5 or the scanning line 6, for example, 2000 Å or more, the higher speed response is possible. It should be remembered that the film thickness needs to be optimized according to the relationship of tradeoff with reduction of an optical characteristic such as transmittance and light diffusing value due to the increased film thickness.

To obtain the amorphous ITO, the film is made at a low temperature of 100° C. or less. By adding $H_2O$ or $H_2$ and forming the film without heating, it is possible to prevent fine crystallization of the ITO due to reduction of partial pressure of residual $H_2O$ in a chamber. Thus, stable amorphous can be obtained.

Since the ITO can be formed through a process at a temperature of 100° C. or less, one or both of the array substrate 1A and the opposed substrate 1B can be comprised of a transparent resin plate made of polycarbonate or the like. As a result, a lightweight liquid crystal display can be obtained. In addition, a crack or break of the substrate in handling during fabrication or carry can be prevented. Moreover, crack and break of the substrate due to shock of dropping, falling or the like can be prevented.

Figure 4:
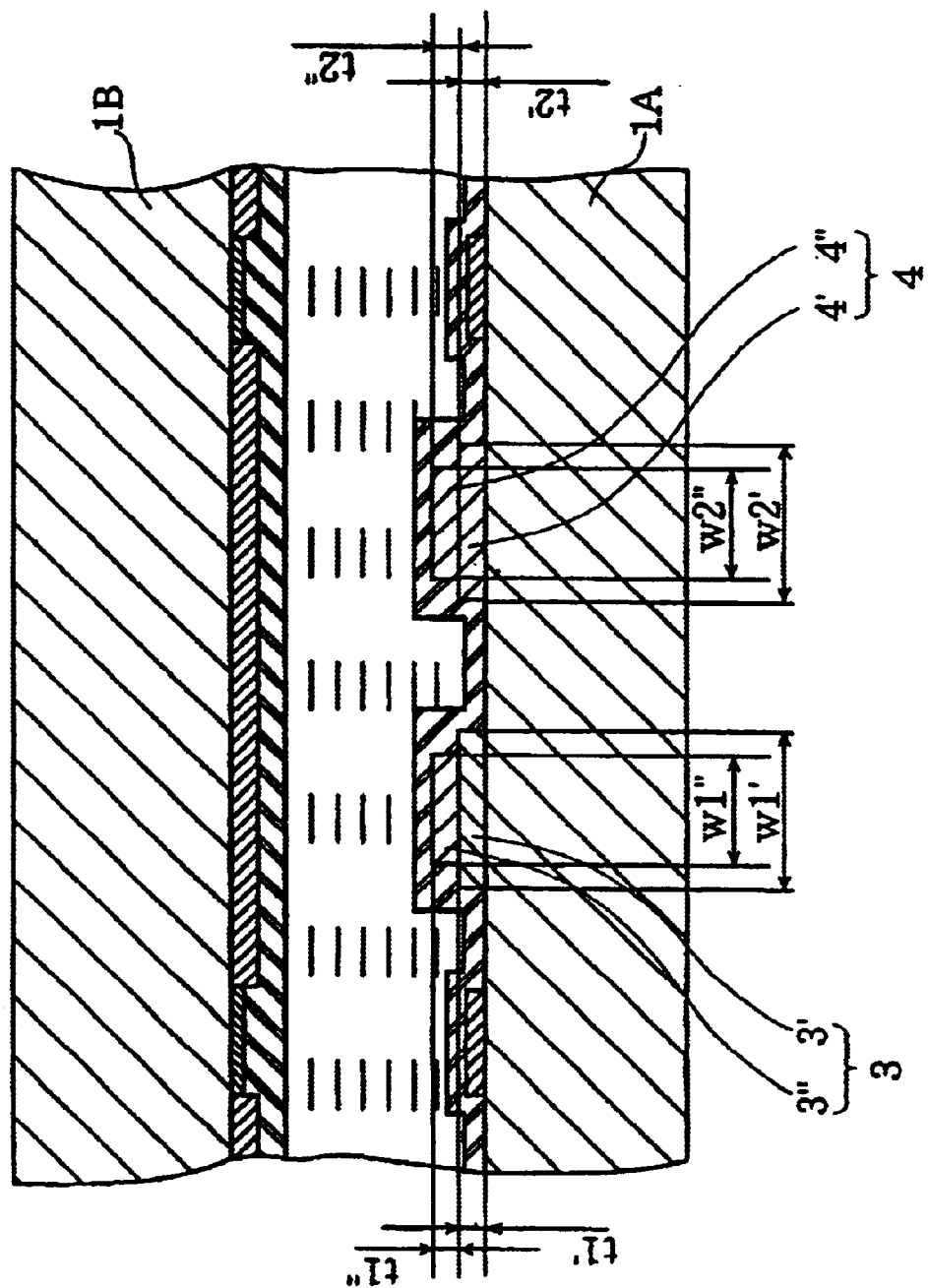
FIG. 4 is a view showing a constitution of a liquid crystal display according to an embodiment 1-2.

FIG. 4 illustrates an embodiment in which the common electrode 3 and the pixel electrode 4 are formed through two-stage processes to provide a convex cross section.

Specifically, in a first process, conductive layers 3', 4' (film thickness t1'=t2'=4000 Å, electrode width w1'=w2'=10 μm) are formed and in a second process, conductive layers 3", 4" (film thickness t1"=t2"=4000 Å, electrode width w1"=w2"=6 μm) are formed, thereby obtaining a convex cross section of the common electrode and a convex cross section of the pixel electrode 4. In the convex cross section, the same effect as provided by Sample (3) of FIG. 3 is obtained.

The cross sections of the common electrode 3 and the pixel electrode 4 are not necessarily rectangular but may be R-shaped with the cross-section of the electrode rounded through the production process for increasing the film thicknesses of the common electrode 3 and the pixel electrode 4 or tapered.

(Embodiment 1-2)

Subsequently, an embodiment 1-2 of the present invention will described.

Figure 5:
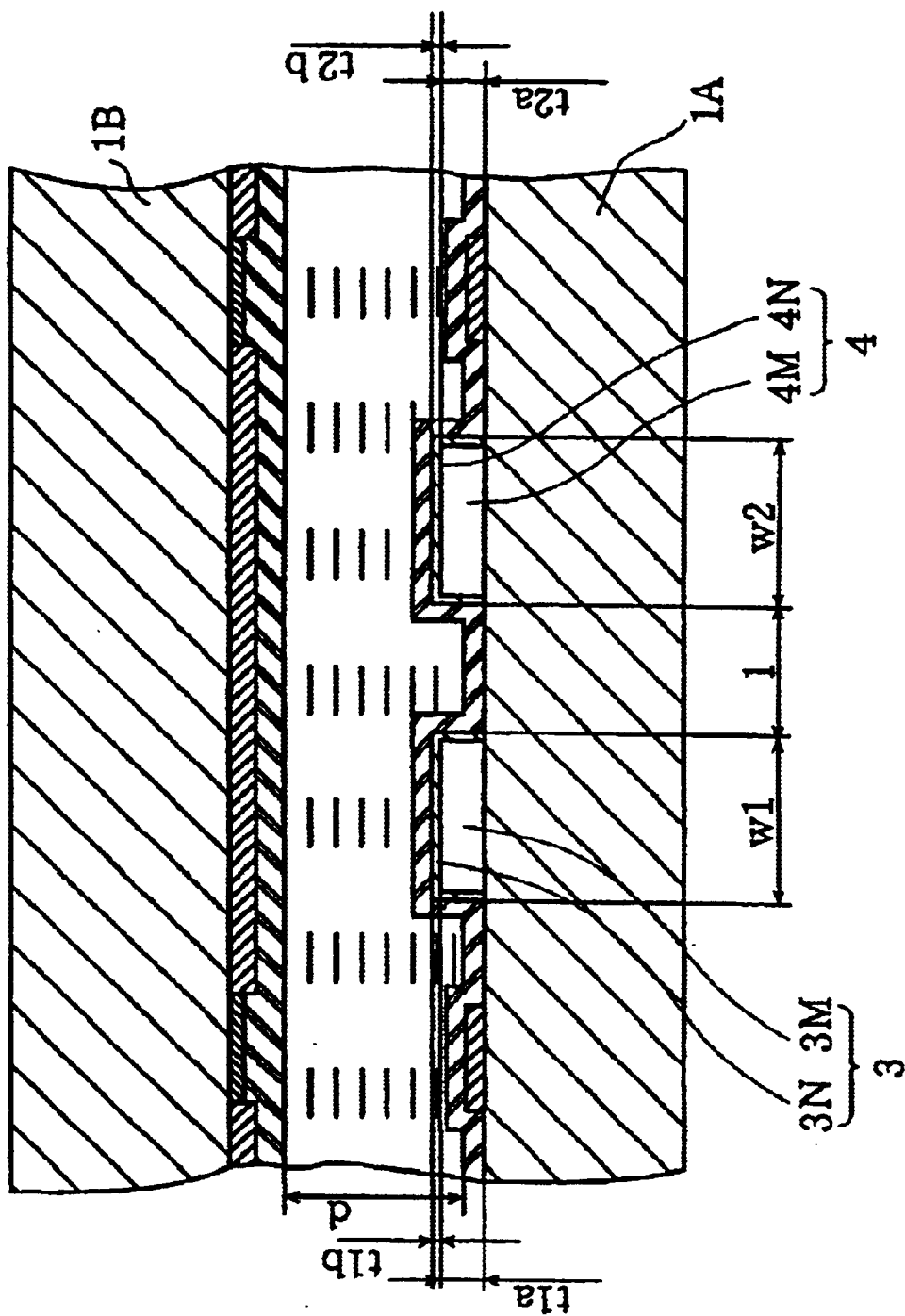
FIG. 5 is a view showing a constitution of a liquid crystal display according to an embodiment 1-3.

FIG. 5 is a cross-sectional view showing a constitution of a liquid crystal display according to an embodiment 1-2 of the present invention. In FIG. 5, 3M, 4M denote transparent resin layers and 3N, 4N denote transparent conductive layers. The common electrode 3 is comprised of the transparent resin layer 3M and the conductive layer 3N and the pixel electrode 4 is comprised of the transparent resin layer 4M and the conductive layer 4N. d denotes cell gap. W1 denotes width of the common electrode 3 and w2 denotes width of the pixel electrode 4. 1 denotes spacing (gap) between the common electrode 3 and the pixel electrode 4. t1$a$ denotes thickness of the transparent resin layer 3M of the common electrode 3. t2$a$ denotes thickness of the transparent resin layer 4M of the pixel electrode. t1$b$ denotes thickness of the transparent conductive layer 3N of the common electrode 3 and t2$b$ denotes thickness of the transparent conductive layer 4N of the pixel electrode 3.

By using photosensitive resin of acrylic-based polymer, as the transparent resin layers 3M, 4M, it is possible to easily form layers having film thickness of approximately 1 μm and a desired pattern such as comb. As the transparent conductive layers 3N, 4N, for example, ITO can be used.

In this embodiment, cell gap d=4 μm, electrode gap 1=3 μm, electrode width w=10 μm, t1$a$=t2$a$=1 μm, and t1$b$=t2$b$= 2000 Å.

In the embodiment 1-2, the electrode gap 1 between the common electrode 3 and the pixel electrode 4 is set smaller than the gap d between the array substrate 1A and the opposed substrate 1B. With this constitution, by utilizing the phenomenon in which the electric field strength around the common electrode 3 and the pixel electrode 4 is increased, the liquid crystal on each electrode can be modulated. Besides, since each of the common electrode 3 and the pixel electrode 4 are comprised of the transparent layer, light over the electrodes can be transmitted therethrough.

Figure 6:
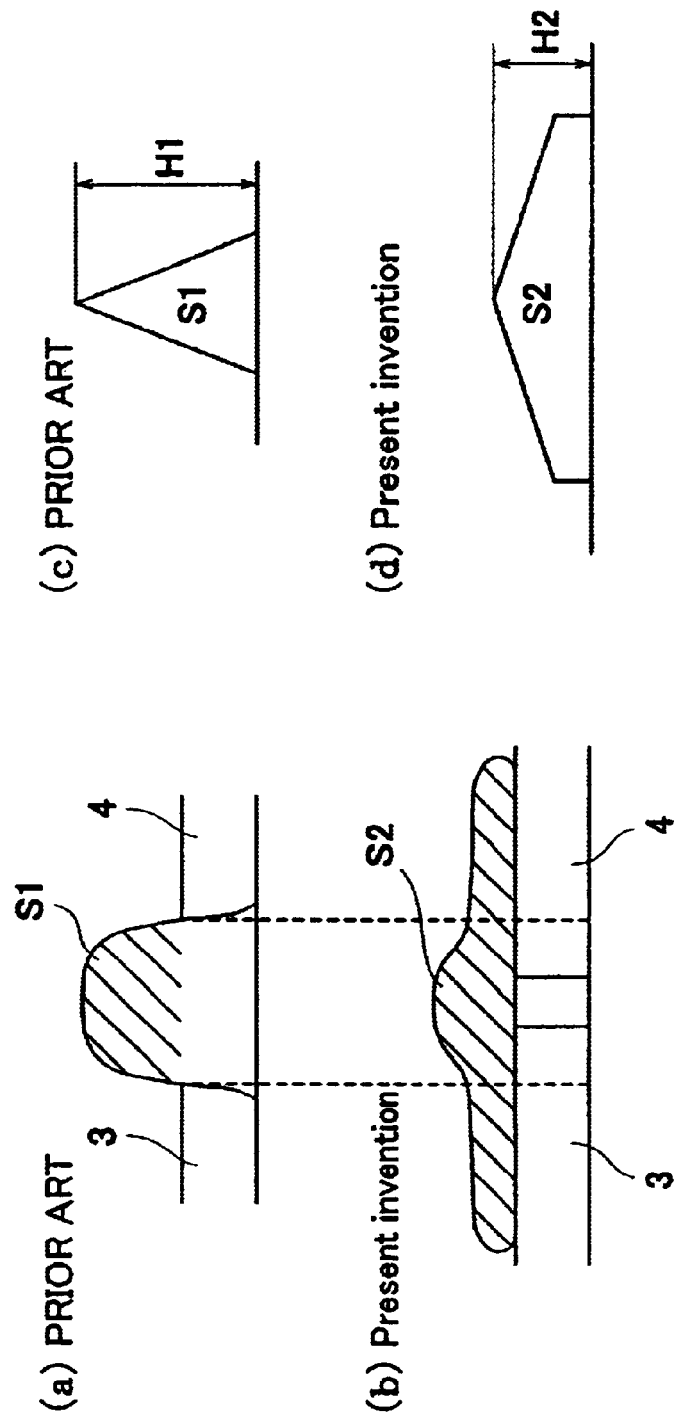
FIGS. 6(a)–FIG. 6(d) are views for explaining a principle of an electrode structure according to the embodiment 1-3.

With reference to FIG. 6, a detailed description is made. FIG. 6($a$) shows a cross-sectional view showing the conventional example (1>d). FIG. 6($b$) shows a view schematically showing a region in b which the liquid crystal is driven in the conventional example (1>d). FIG. 6($c$) is a cross-sectional view of the present invention (1<d). FIG. 6($b$) shows the view schematically showing the region in which the liquid crystal is driven in the present invention (1<d). In the conventional example, the liquid crystal molecules over the electrodes are not driven but the liquid crystal molecules only in the region S1 indicated by oblique lines are driven. On the other hand, according to the present invention, the liquid crystal molecules over a wide region over the electrodes are driven as shown in oblique-line region S2 of FIG.

6(b). In this case, since transparent electrodes are used as the electrodes of the present invention, the regions over the electrodes can be used as liquid crystal display regions. Accordingly, the transmittance can be improved. The electric field strength between the electrodes is larger in the conventional example than the present invention, whereas the region of the liquid crystal driven by the electric field is larger in the present invention than in the conventional example. As shown in FIGS. 6(b), 6(d), heights of the regions in which the liquid crystal is driven is H1>H2 but areas thereof is S1<S2. So, a liquid crystal display of the present invention provides enhanced brightness and contrast as the whole liquid crystal panel as compared to the conventional example. In addition, the electric field distribution over the electric field varies gently as shown in FIG. 6(d), uniform display without unevenness is achieved.

Thus, in this embodiment, the high-speed response liquid crystal panel can be obtained without reducing the transmittance.

The purpose of this embodiment is to increase the electrode layer thickness t1 without reducing the transmittance of the electrode portion. With this constitution, the effects equal to or greater than that of the embodiment 1-1 are obtained.

(Embodiment 1-3)

An embodiment 1-3 of the present invention will be described with reference to Figures.

Figure 7:
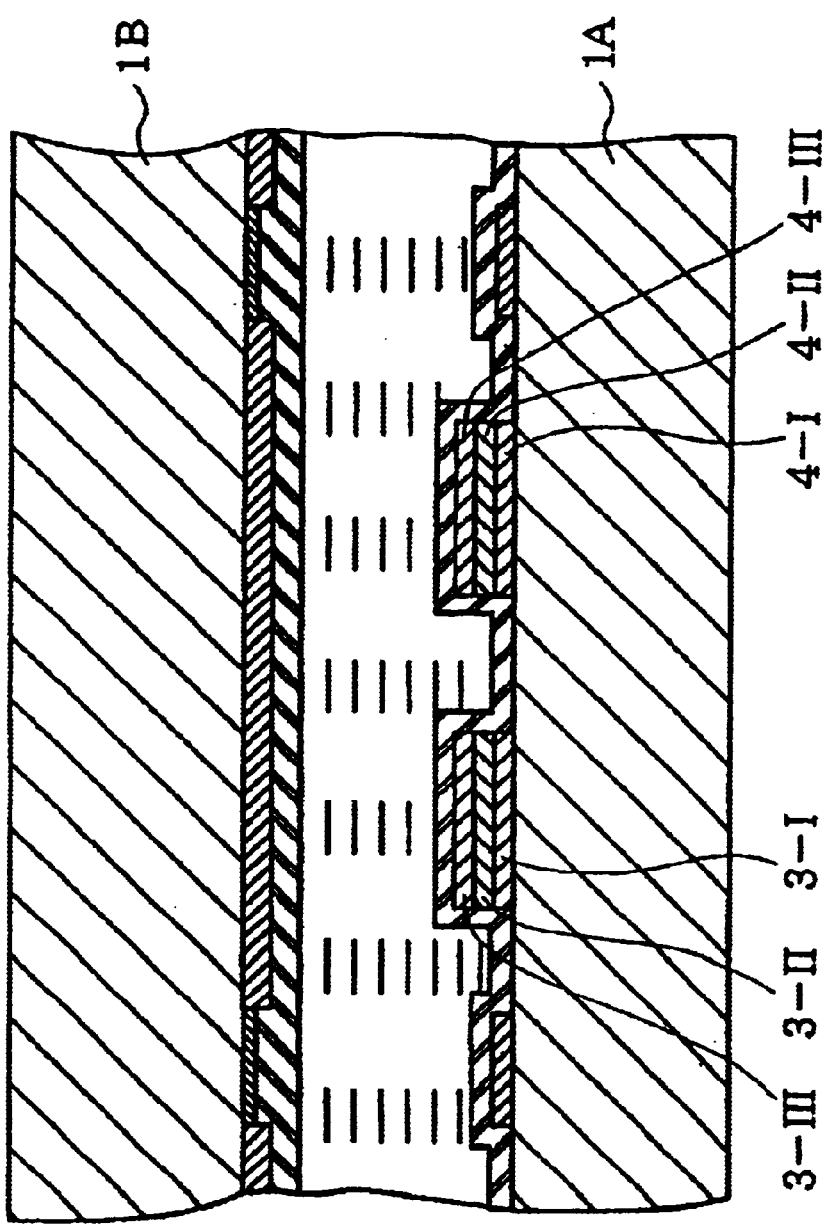
FIG. 7 is a view showing a constitution of a liquid crystal display according to an embodiment 1-4.

FIG. 7 is a cross-sectional view showing a constitution of a liquid crystal display according to a second embodiment of the present invention.

In FIG. 7, 3-I denotes a first layer of the common electrode 3, 3-II denotes a second layer of the common electrode 3, 3-III denotes a third layer of the common electrode 3, 4-I denotes a first layer of the pixel electrode 3, 4-II denotes a second layer of the pixel electrode 4, and 3-III denotes a third layer of the common electrode 3.

In this embodiment, 3-I, 4-I denote red(R), i.e., approximately 700 nm wavelength region, 3-II, 4-II denote green (G), i.e., approximately 546 nm wavelength region, 3-III, 4-III denote blue (B), i.e., approximately 436 nm wavelength region. These are respectively ITO electrodes obtained by adjusting film components and film thicknesses thereof to have spectral characteristics which result in most preferable transmittances.

With this constitution, the electrode layer thicknesses t1, t2 can be increased without reducing the whole transmittance.

In the above-described example, the common electrode and the pixel electrode are each composed of three layers having spectral characteristics respectively corresponding to Red (R), Green (G), and Blue (B). The present invention is not limited to this. These electrodes may be comprised of the layer corresponding to at least one type of Red (R), Green (G), and Blue (B). In the present invention, instead of Red (R), Green (G), and Blue (B), these electrodes may be comprised of layers having spectral characteristics in which the most preferable transmittances are obtained in another desired wavelengths according to uses.

Second Invention Group

The second invention group relates to a liquid crystal display having layered pixel electrode and common electrode. Hereinbelow, the second invention group will be described with reference to Figures.

(Embodiment 2-1)

FIG. 8(a) is a cross-sectional view showing a constitution of a liquid crystal display according to the embodiment 2-1.

FIG. 8(b) is a plan view showing a constitution of the liquid crystal display according to the embodiment 2-1. FIG. 8(c) is a cross-sectional view showing a constitution of the liquid crystal display according to the embodiment 2-1 and taken substantially along line A—A of FIG. 8(b). FIG. 9 is an enlarged cross-sectional view showing a semiconductor switching element 7 of a liquid crystal display according to an embodiment 2-1 and its vicinity.

Figure 8:
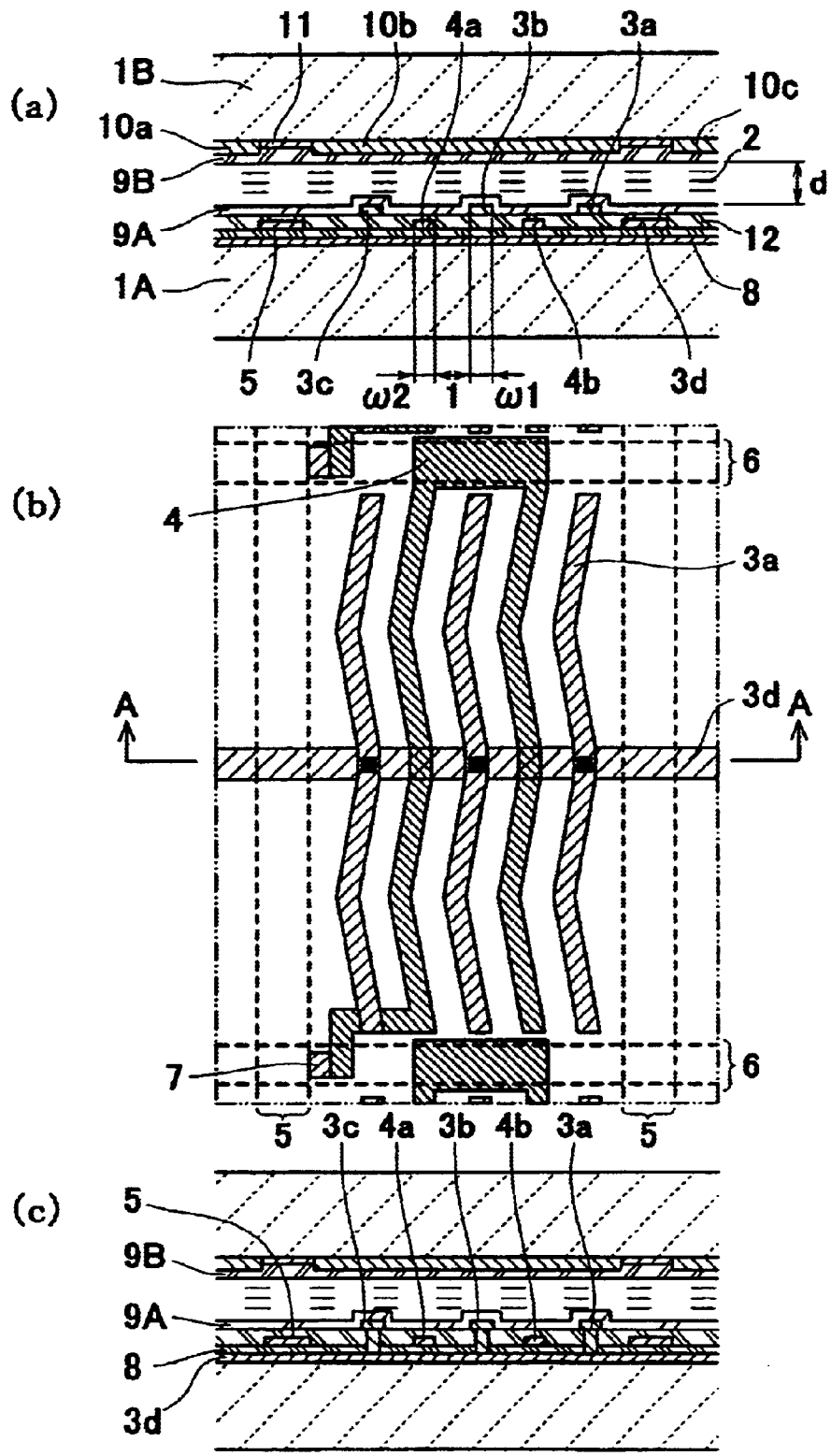
Figure 9:
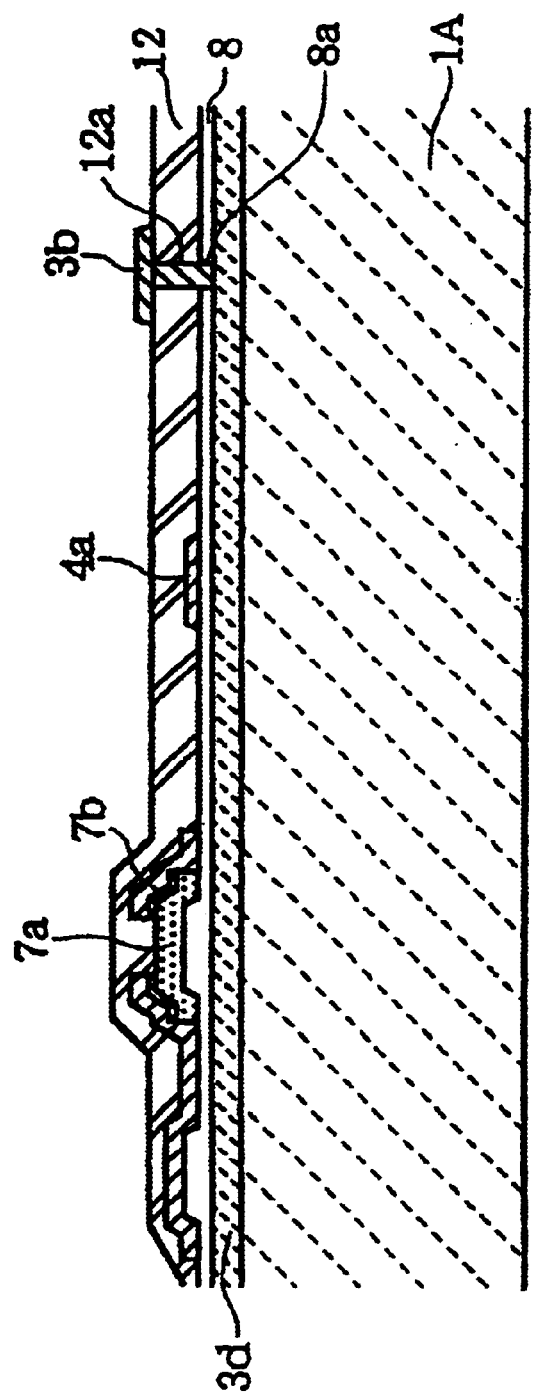
FIG. 9 is an enlarged cross-sectional view showing a constitution of a semiconductor switching element of the liquid crystal display according to the embodiment 2-1 and its vicinity.

In FIG. 8, 1A denotes an array substrate, 1B denotes an opposed substrate, 2 denotes liquid crystal, 3 denotes a common electrode, 4 denotes a pixel electrode, 5 denotes a video signal line connected to the pixel electrode 4:for supplying a video signal, 6 denotes a scanning signal line, 7 denotes a semiconductor switching element, 8 denotes a first insulating layer, 9A denotes an alignment layer formed on an inner surface of the array substrate 1A, 9B denotes an alignment layer formed on an inner surface of the opposed substrate 1B, 10a denotes a Red color filter material, 10b denotes a Green color filter material, 10c denotes a blue color filter material, 11 denotes a black matrix (mask layer), and 12 denotes a second insulating layer.

In FIG. 9, 7a denotes a-Si layer, 7b denotes n$^+$-type a-Si layer, 8a denotes a contact hole provided in the first insulating layer 8, and 12a denotes a contact hole provided in the second insulating layer 12.

Hereinbelow, a method for fabricating so constituted liquid crystal display will be explained with reference to FIGS. 8, 9.

First, a non-transparent conductor made of Al, Ti, or the like is formed on the array substrate 1A and a wiring portion 3d of the common electrode and the scanning signal line 6 are patterned to have a predetermined shape. A first insulating layer 8 is formed on the so formed first electrode group, and a semiconductor switching element 7 comprised of a-Si layer 7a and n$^+$-type a-Si layer 7b are formed on a predetermined portion of the first insulating layer 8. A non-transparent conductor made of Al, Ti or the like is formed on a predetermined portion of the first insulating layer 8 and the semiconductor switching element 7, thereby forming the second electrode group comprised of the video signal line and the pixel electrode by patterning them.

Subsequently, a second insulating layer made of SiNx or the like is formed on the array substrate 1A having the first electrode group and the second electrode group. The second insulating layer 12 serves as a protection film for protecting the semiconductor switching element 7.

Then, electrode portions 3a, 3b, 3c of the common electrode are formed using ITO films as transparent conductors.

To provide electric conduction between the wiring portion 3d of the common electrode made of the non-transparent conductor and the electrode portions 3a, 3b, 3c of the common electrode made of the transparent conductor, the first insulating layer 8 and the second insulating layer 12 are respectively provided with contact holes 8a, 12a.

Thereafter, the alignment layers 9A, 9B made of polyimide or the like for aligning molecules of the liquid crystal 2 are respectively formed on the array substrate 1A and the opposed substrate 1B. The transparent substrate 1B is provided opposite to the transparent substrate 1A, and is provided with the red color filter material 10a, the green color filter material 10b, the blue color filter material 10c, and the black matrix to have a predetermined pattern.

The array substrate 1A and the opposed substrate 1B so created respectively are treated such that initial predetermined orientation directions are formed therein and peripheral portion thereof are bonded using a sealing agent, followed by filling the liquid crystal 2 for sealing.

The semiconductor switching element 7 is on/off-controlled by a drive signal input through the video signal line 5 and the scanning signal line 6. A voltage is applied across the pixel electrode 4 connected to the semiconductor switching element 7 and the common electrode 3 to generate an electric field, thereby changing the orientation of the liquid crystal 2 to thereby control luminances of respective pixels. Thus, an image is displayed.

In FIG. 8, d denotes cell gap, w1 denotes line width of the electrode portion 3b of the common electrode, w2 denotes line width of the electrode portion 4a of the pixel electrode, w1' denotes line width of the electrode portion 3a of the common electrode, 1 denotes spacing (gap) between the electrode portion 3b of the common electrode and the electrode portion of the pixel electrode 4a.

In this embodiment, as shown in FIG. 8, the line width w1 of the electrode portions 3a, 3b, 3c is 5 $\mu$m, the line width w2 of the electrode portions 4a, 4b, of the pixel electrode is 4 $\mu$m, and cell gap d is 49 $\mu$m, and the spacing (gap) 1 between electrodes is 10 $\mu$m. That is, the line width w1 of the electrode portion of the common electrode 3 and the line width w2 of the electrode portion of the pixel electrode 4 are set substantially equal to the gap d (cell gap) between the array substrate and the opposed substrate.

The electrodes are, as shown in FIG. 8(b), patterned to have comb shape in which the electrode portion of the common electrode 3 and the electrode portion of the pixel electrode 4 are alternately arranged, thereby forming a lateral electric field between the electrode portion of the common electrode 3 and the electrode portion of the pixel electrode 3. Such an electrode constitution allows the electric field strength over the electrodes to be increased by an electric field around the electrodes as well as the lateral electric field, thereby causing the liquid crystal to be rotated. So, the use of the transparent conductive material for the electrode allows the light over the electrodes to be transmitted therethrough.

As the liquid crystal material of the liquid crystal layer 2, cyano-based liquid crystal material containing approximately 10–20% cyano compound is used. Retardation $\Delta n \times d$ (product of cell gap d and refractive index difference $\Delta n$) is approximately 350 nm. Spray elastic constant of the liquid crystal material of the liquid crystal layer 2 is k11=12(pN), twist elastic constant is k22=7(pN), bend elastic constant is K33=18 (pN), and dielectric constant anisotropy is $\Delta \in$=+8. The dielectric constant anisotropy $\Delta \in$ and the bend elastic constant K33 are important factors in determination of the drive voltage of the liquid crystal. It is particularly preferable that the dielectric constant anisotropy $\Delta \in$ is +8 or more and the bend elastic constant K33 is 18(pN) or less.

The combination of the liquid crystal layer 2 and the electrode constitution is capable of satisfactorily increasing the electric field strength over the electrodes and driving the liquid crystal by the conventionally applied drive voltage (approximately 5V).

By bending the comb-shaped electrode portion, the liquid crystal molecules are rotated in two directions. Thereby, colorings depending on viewing angle directions cancel each other and a panel configuration in which color hardly changes depending on the viewing angle direction is obtained. By bending the video signal line 5 and the black matrix 11 so as to have a bending angle equal to that of the electrode portion of the common electrode 3 and the electrode portion of the pixel electrode 4, although this is not shown, there is no increase in the light-blocking area regardless of the fact that the electrode portions are bent. Therefore, a liquid crystal panel with higher aperture ratio is obtained.

Subsequently, function and effects of the panel configuration according to the embodiment will be explained.

Figure 10:
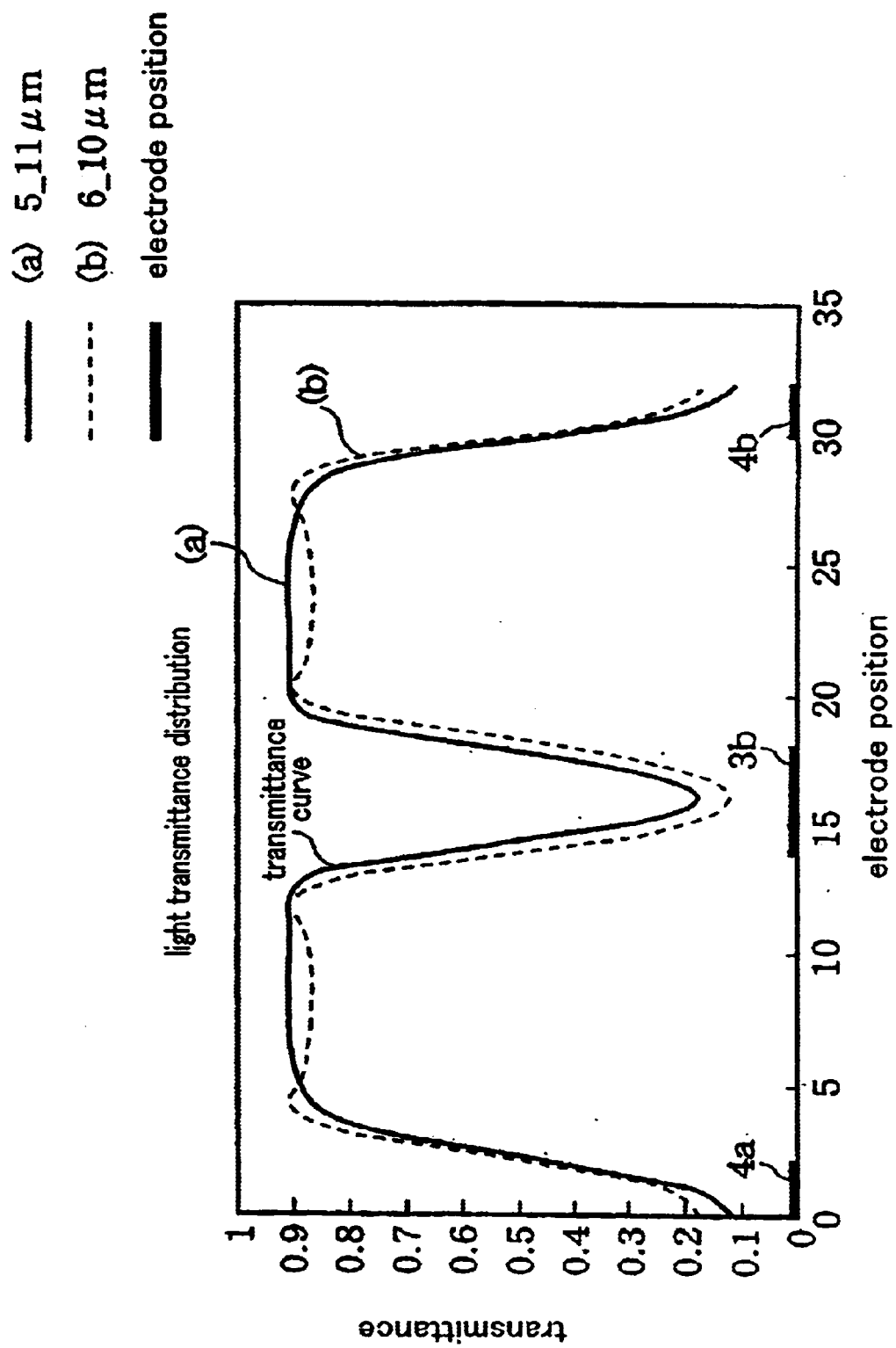
FIG. 10 is a view showing a light transmittance characteristic of the liquid crystal display according to the embodiment 2-1.

FIG. 10 shows a light transmittance characteristic (light transmittance of the panel is calculated from the electric field distribution and liquid crystal director) of the liquid crystal panel having the above-described panel configuration according to this embodiment and using the cyano-based liquid crystal material. The drive voltage is set to 5V. In case of line (a) of FIG. 10, the electrode constitution is that line width w1 of the common electrode 3a, 3b, 3c is 5 $\mu$m, line width w2 of the pixel electrodes 4a, 4b is 4 $\mu$m, cell gap d is 4 $\mu$m, and spacing (gap) 1 between electrodes is 10 $\mu$m. In case of line (b) of FIG. 10, the electrode constitution is that line width w1 of the common electrode 3a, 3b, 3c is 6 $\mu$m, line width w2 of the pixel electrodes 4a, 4b is 6 $\mu$m, cell gap d is 4 $\mu$m, and spacing (gap) 1 between electrodes is 11 $\mu$m.

In general, since ITO is slightly difficult to minutely pattern as compared to Al, Ti or the like, the line width of the ITO is set slightly larger than that of Al, Ti, or the like. Since Al, Ti, or the like is a non-transparent conductor which transmits no light, it is desirable to perform patterning as minutely as possible, whereas since the ITO transmits light, the aperture ratio is not reduced irrespective of a slight increase in the line width.

That is, the line (a) and line (b) of FIG. 10 illustrate comparison made between light transmittance characteristics of liquid crystal panel configurations in which only the electrode line width and the electrode spacing are different.

Figure 11:
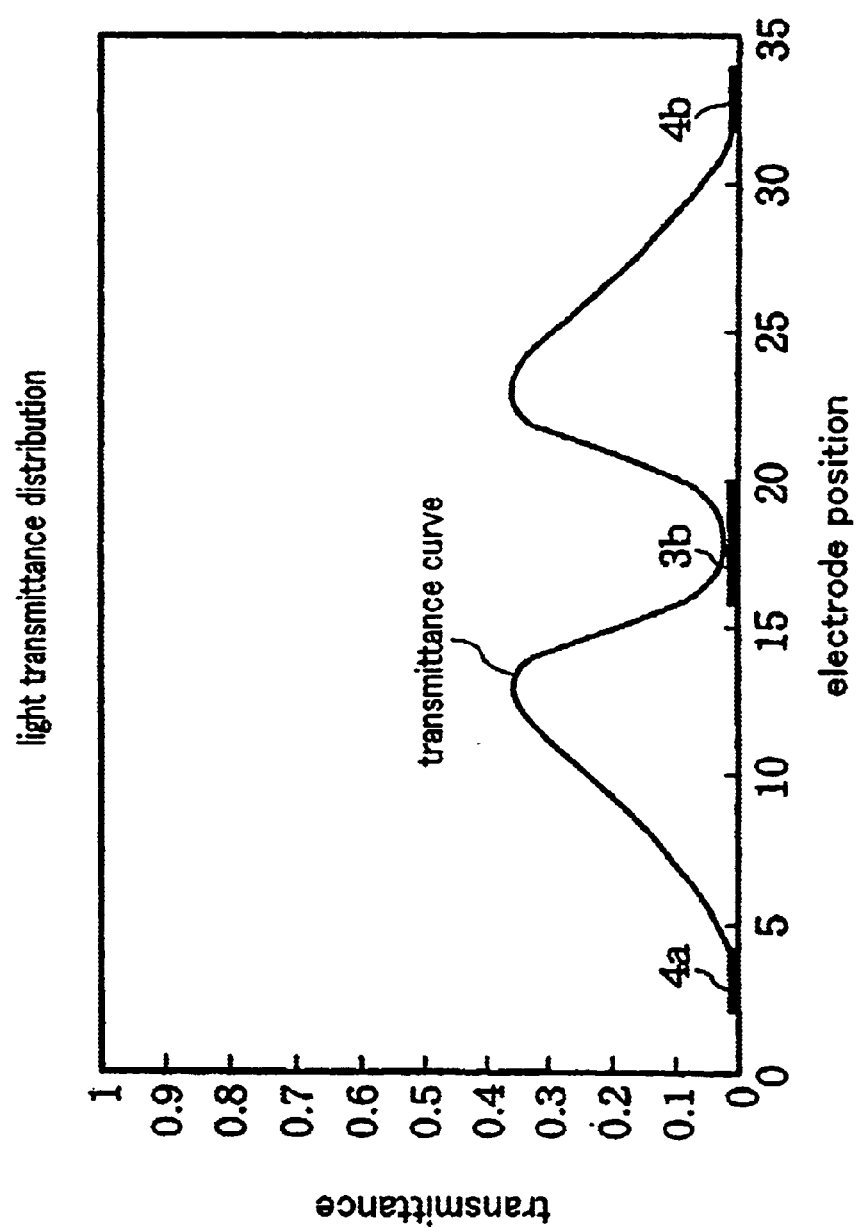
FIG. 11 is a view showing a light transmittance characteristic of the conventional liquid crystal display.

FIG. 11 shows a light transmittance characteristic (light transmittance of the panel is calculated from the electric field distribution and liquid crystal director) of a liquid crystal panel having the same electrode constitution and panel configuration as in FIG. 10 and using a fluorine-based liquid crystal material (spray elastic constant K11=9(pN), twist elastic constant K22=9(pN), bend elastic constant K33=22 (pN), dielectric constant anisotropy $\Delta \in$=+4.4). The drive voltage is set to 5V as in the case of FIG. 10.

The results clearly show that the constitution of FIG. 10 using the cyano-based liquid crystal material provides transmittance higher than that of the constitution of FIG. 11 using the fluorine-based liquid crystal material.

In particular, in the constitution of FIG. 11 using the fluorine-based liquid crystal material, little light is transmitted through the portion over the electrodes, while in the constitution of FIG. 10 using the cyano-based liquid crystal, at least approximately 10–20% light can be transmitted. By using the transparent conductive layer such as ITO or the like as the electrode, the aperture ratio can be greatly increased. Also, the smaller electrode line width provides larger electric, field strength and higher transmittance over the electrodes. However, if a vertical electric field has an extremely strong effect, color is greatly changed depending on the viewing angle. Therefore, it is desirable to set the electrode line width to 49 $\mu$m at maximum.

When the scanning signal line 6 and the common electrode 3 are formed in the same layer, the comb-shaped portions 3a, 3b, 3c of the electrode portion 3 and the scanning signal line 6 are placed in close proximity. It is therefore highly probable that defect due to shortening occurs. On the other hand, since the layer of the comb-shaped portions 3a, 3b, 3c of the common electrode 3 and the layer of the scanning signal line 6 differ from each other, the defect due to shortening can be prevented.

While in this embodiment, a-Si (amorphous silicon) is used in the semiconductor switching element 7, the same effects can be provided by using another semiconductor layers such as P-Si (polysilicon).

In this embodiment, the example of the bent electrode has been described. The aperture ratio can be substantially improved regardless of the shape of the electrode, for example, line-shaped electrodes, enclosure-shaped electrodes, etc.

(Embodiment 2-2)

FIG. 12(a) is a cross-sectional view showing a constitution of a liquid crystal display according to an embodiment 2-2. FIG. 12(b) is a plan view showing a constitution of a liquid crystal display according to the embodiment 2-2. FIG. 12(c) is a cross-sectional view showing a constitution of a liquid crystal display according to an embodiment 2-2 and a cross-sectional view taken substantially along A—A of FIG. 12(b).

Figure 13:
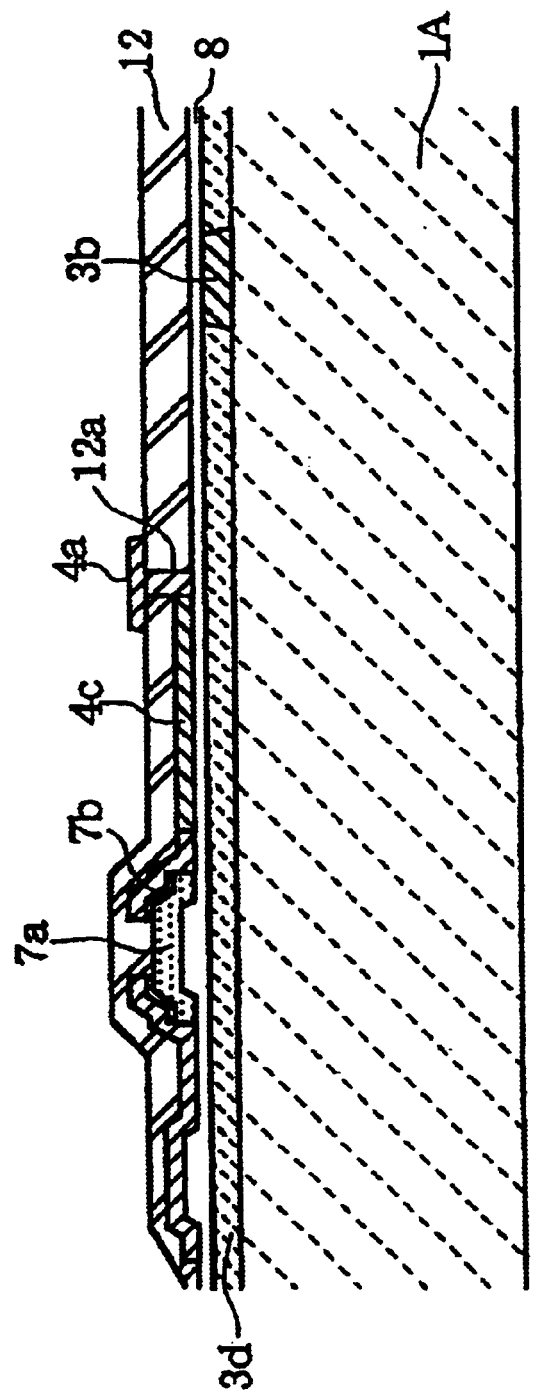
FIG. 13 is an enlarged cross-sectional view showing a constitution of a semiconductor switching element of the liquid crystal display according to the embodiment 2-2 and its vicinity.

FIG. 13 is an enlarged cross-sectional view showing a constitution of a semiconductor switching element of the liquid crystal display according to the embodiment 2-2 and its vicinity.

This embodiment differs from the embodiment 2-1 in that transparent conductors are employed as electrode portions 4a, 4b of the pixel electrode.

Figure 12:
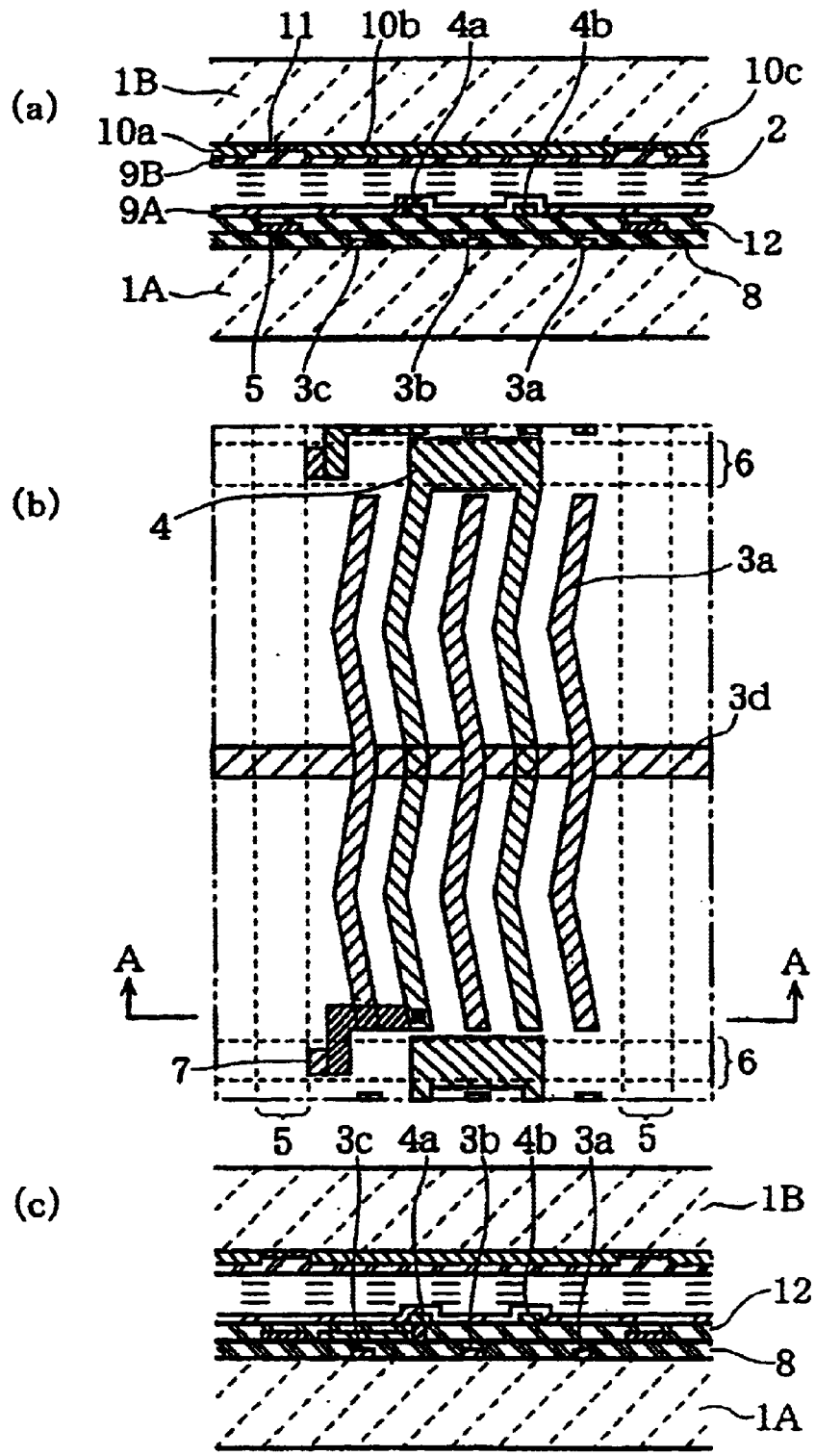

An operation will be described with reference to FIGS. 12, 13.

First, a non-transparent conductor made of Al, Ti, or the like is formed on the array substrate 1A and the common electrode 3 and the scanning signal line 6 are patterned to have a predetermined shape. A first insulating layer 8 is formed on so formed first electrode group, and a semiconductor switching element 7 comprised of a-Si layer 7a and n$^+$-type a-Si layer 7b are formed on a predetermined portion of the first insulating layer 8. A non-transparent conductor made of Al, Ti or the like is formed on the predetermined portion of the first insulating layer 8 and the semiconductor switching element 7, thereby forming the second electrode group comprised of the video signal line 5 and the wiring portion 4c of the pixel electrode by patterning them.

Subsequently, a second insulating layer 12 made of SiNx or the like is formed on the array substrate 1A having the first electrode group and the second electrode group. The second insulating layer 12 serves as a protection film for protecting the semiconductor switching element 7.

Then, the comb-shaped portions 4a, 4b of the pixel electrode are formed using ITO films as transparent conductors.

To provide electric conduction between the wiring portion 4c of the pixel electrode made of the non-transparent conductor and the electrode portions 4a, 4b of the pixel electrode made of the transparent electrode, the second insulating layer 12 is provided with a contact hole 12a.

The electrode shape of the other portions, the liquid crystal material, or the line are identical to those of the embodiment 2-1.

With this constitution, a liquid crystal panel with high aperture ratio is obtained as in the embodiment 2-1.

(Embodiment 2-3)

FIG. 14(a) is a cross-sectional view showing a constitution of a liquid crystal display according to an embodiment 2-3. FIG. 14(b) is a plan view showing a constitution of a liquid crystal display according to the embodiment 2-3. FIG. 14(c) is a cross-sectional view showing a constitution of a liquid crystal display according to an embodiment 2-3 and a cross-sectional view taken substantially along A—A of FIG. 14(b).

Figure 15:
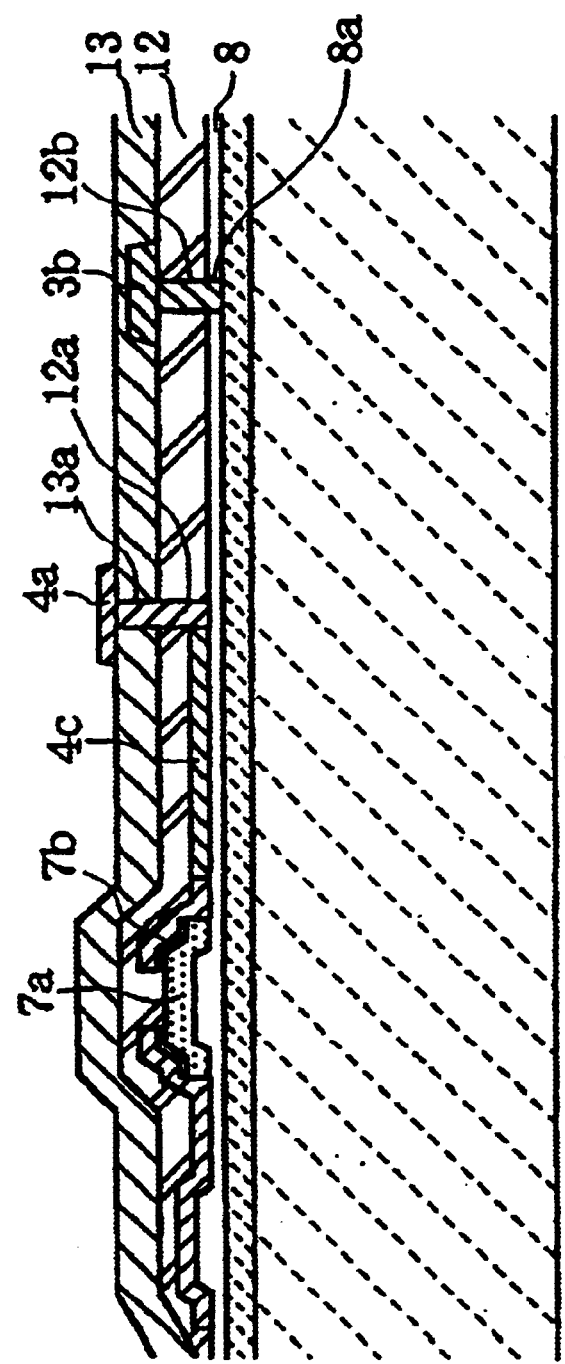
FIG. 15 is an enlarged cross-sectional view showing a constitution of a semiconductor switching element of the liquid crystal display according to the embodiment 2-3 and its vicinity.

FIG. 15 is an enlarged cross-sectional view showing a constitution of a semiconductor switching element of the liquid crystal display according to the embodiment 2-3 and its vicinity.

This embodiment differs from the embodiments 2-1, 2-2 in that transparent conductors are employed as electrode portions 3a, 3b, 3c of the common electrode and electrode portions 4a, 4b of the pixel electrode.

Figure 14:
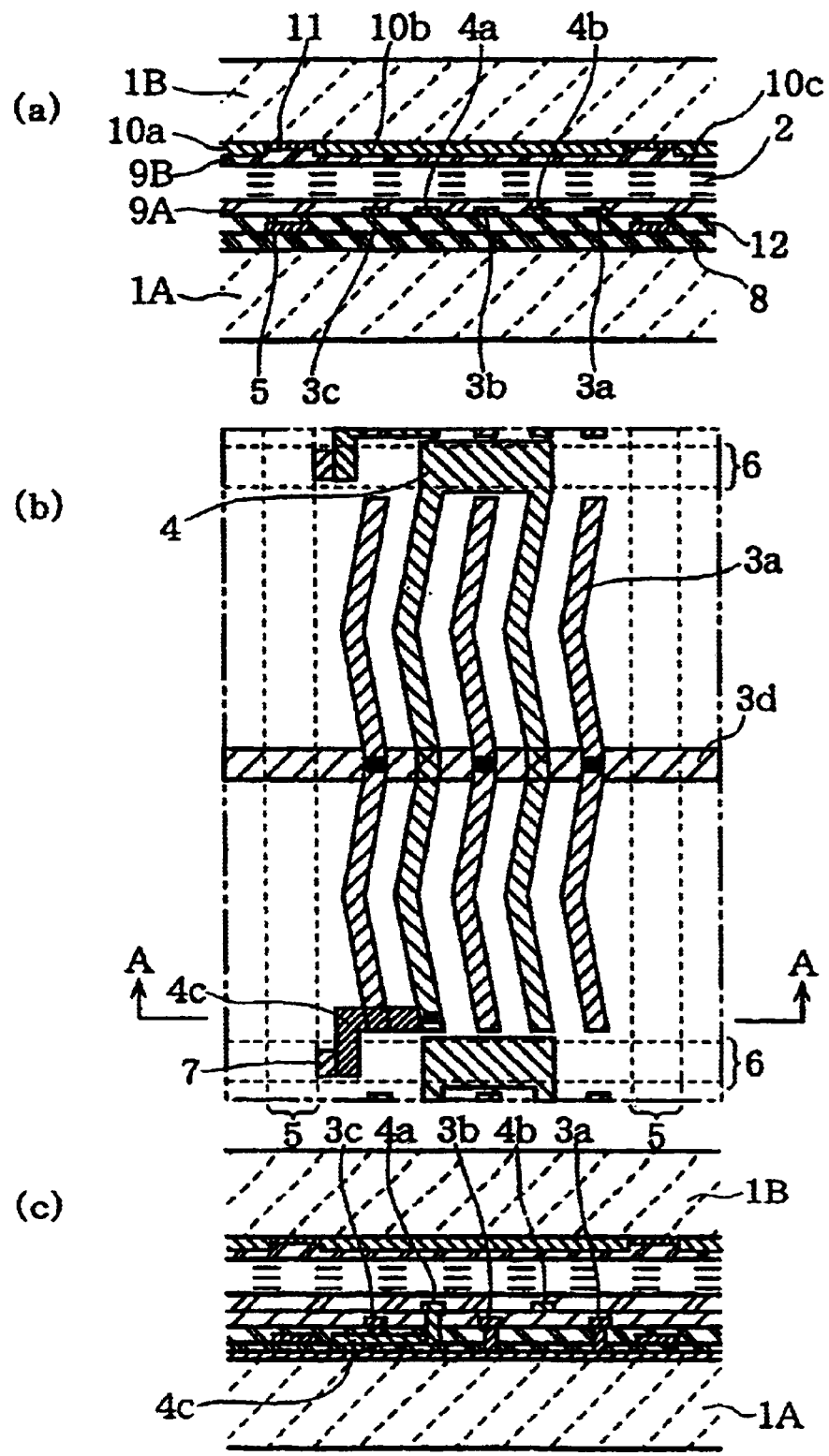

An operation will be described with reference to FIGS. 14, 15.

First, a non-transparent conductor made of Al, Ti, or the like is formed on the array substrate 1A and the wiring portion 3d of the common electrode and the scanning signal line 6 are patterned to have a predetermined shape. A first insulating layer 8 is formed on so formed first electrode group, and then a semiconductor switching element 7 comprised of a-Si layer 7a and n$^+$-type a-Si layer 7b are formed on a predetermined portion of the first insulating layer 8. A non-transparent conductor made of Al, Ti or the like is formed on the predetermined portion of the first insulating layer 8 and the semiconductor switching element 7, and the second electrode group comprised of the video signal line 5 and the wiring portion 4c of the pixel electrode are patterned to have a predetermined shape.

Subsequently, a second insulating layer 12 made of SiNx or the like is formed on the array substrate 1A having the first electrode group and the second electrode group. The second insulating layer 12 serves as a protection film for protecting the semiconductor switching element 7.

Then, the electrode portions 3a, 3b, 3c of the common electrode are formed using ITO films as transparent conductors and a third insulating layer 13 made of SiNx or the like is formed. Thereafter, electrode portions 4a, 4b of the pixel electrode are formed using ITO films as transparent conductors.

To provide electric conduction between the wiring portion 3d of the common electrode made of the non-transparent conductor and the comb-shaped portions 3a, 3b, 3c of the common electrode made of the transparent conductors, the first insulating layer 8 and the second insulating layer 12 are respectively provided with contact holes 8a, 12a. Also, to provide electric conduction between the wiring portion 4c of the pixel electrode made of the non-transparent conductor and the electrode portions 4a, 4b of the common electrode made of the transparent conductors, the second insulating layer 12 and the third insulating layer 13 are provided with contact holes 12a, 13a.

The electrode shape of the other portions, the liquid crystal material, or the line are identical to those of the embodiment 2-1 or 2-2.

With this constitution, a liquid crystal panel with aperture ratio higher than those of the embodiment 2-1, 2-2 is obtained.

(Embodiment 2-4)

Figure 16:
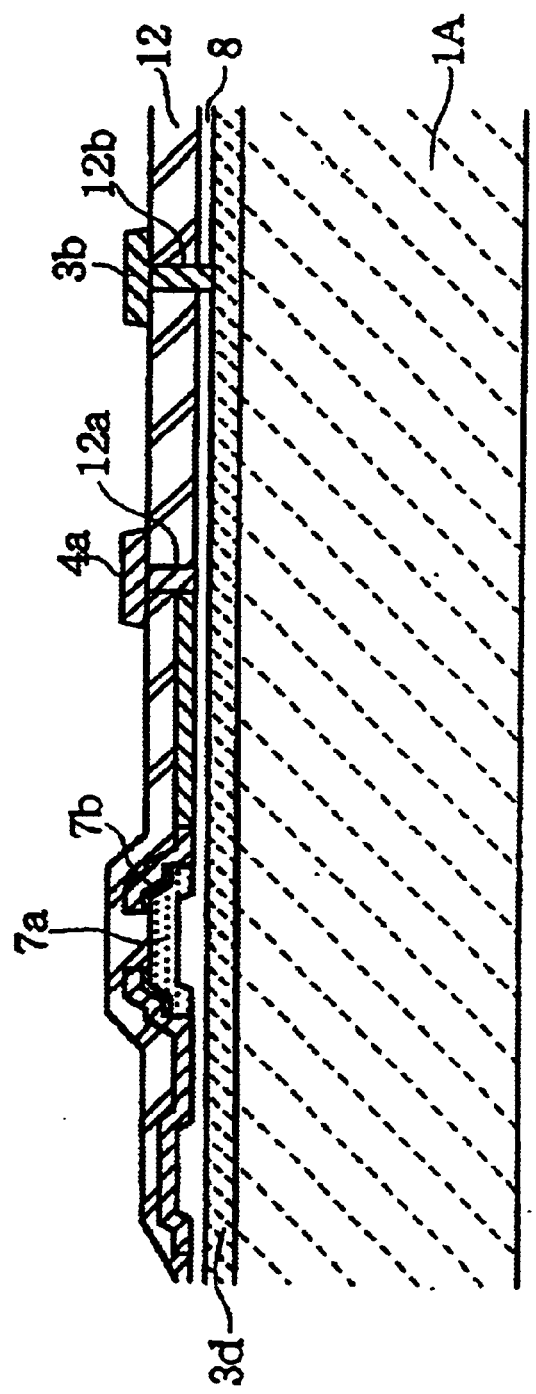
FIG. 16 is an enlarged cross-sectional view showing a constitution of a semiconductor switching element of a liquid crystal display according to an embodiment 2-4 and its vicinity.

FIG. 16 is an enlarged cross-sectional view showing a constitution of a semiconductor switching element of the liquid crystal display according to the embodiment 2-4 and its vicinity.

This embodiment is identical to the embodiment 2-3 in that transparent conductors are used as electrode portions 3a, 3b, 3c of the common electrode and electrode portions 4a, 4b of the pixel electrode and differs from the same in that these electrode portions are formed in the same layer.

Therefore, in fabrication of the liquid crystal display according to the embodiment 2-4, the steps of forming the second electrode group and the second insulating layer and its preceding steps may be the same as the embodiment 2-3. That is, the electrode portion 3a, 3b, 3c of the common electrode and the electrode portions 4a, 4b of the pixel electrode are formed on the second insulating layer using transparent conductors.

With this constitution, it is possible to obtain a liquid crystal panel with processes fewer than those of the embodiment 2-3 and with the aperture ratio higher than that of the embodiment 2-1 or 2-2.

(Embodiment 2-5)

FIG. 17(a) is a cross-sectional view showing a constitution of a liquid crystal display according to an embodiment 2-5. FIG. 17(b) is a plan view showing a constitution of a liquid crystal display according to the embodiment 2-5.

Figure 17:
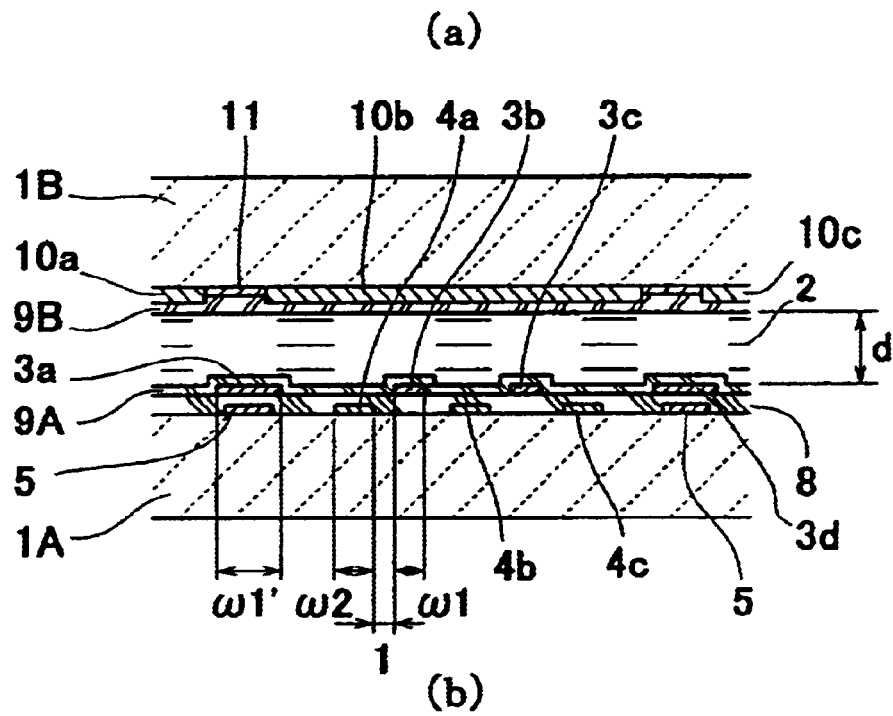
Figure 17:
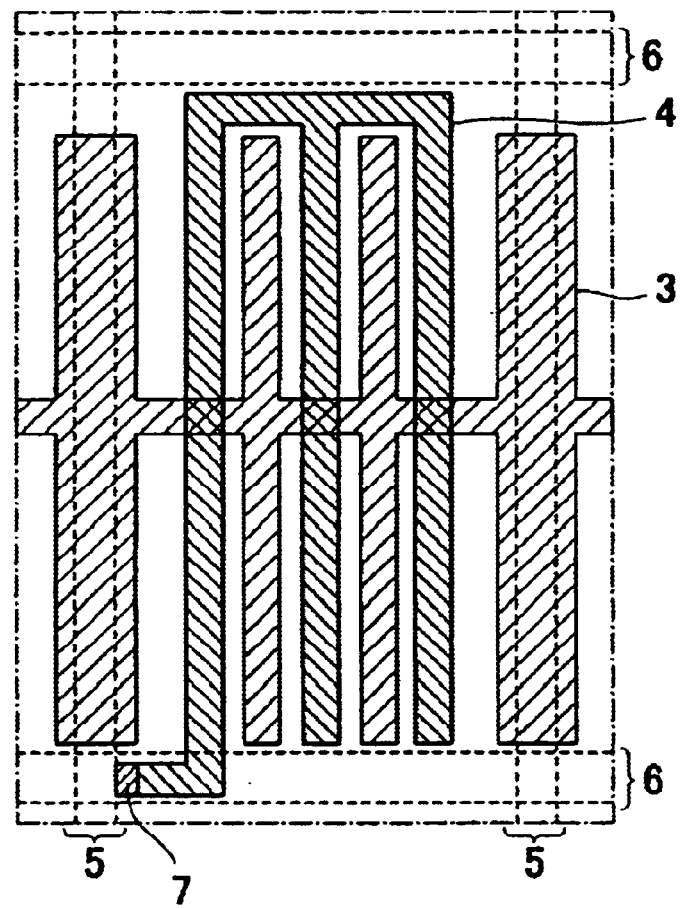

In FIG. 17, 1A denotes an array substrate, 1B denotes an opposed substrate, 2 denotes a liquid crystal, 3 denotes a common electrode, 4 denotes a pixel electrode, 5 denotes a video signal line connected to the pixel electrode 4 for supplying a video signal, 6 denotes a scanning signal line, 7 denotes a semiconductor switching element, 8 denotes a transparent insulating layer, 9A denotes an alignment layer formed on an inner surface of the array substrate 1A, 9B denotes an alignment layer formed on an inner surface of the opposed substrate 1B, 10a denotes a red color filter material, 10b denotes a green color filter material, 10c denotes a blue color filter material, 11 denotes a black matrix (mask layer).

Hereinbelow, fabrication of the liquid crystal display so constituted will be explained with reference to FIG. 17.

First, the scanning signal line 6 patterned by a conductive film made of Al or the like and an insulating film are formed on the array substrate 1A, and then the semiconductor switching element 7 made of a-Si or the like and the video signal line 5 patterned by a conductive film made of Al or the like are formed thereon.

This embodiment adopts In-Plane Switching. The common electrode 3 and the pixel electrode 4 are patterned in comb shape as shown in FIG. 17(b) using ITO film as a transparent conductor or conductive film made of Al or the like.

The pixel electrode 4 is formed in the same layer as the video signal line 5, the scanning signal line 6, or the semiconductor switching element 7 using ITO film or the like as a transparent conductor.

Further, a transparent insulating layer 8 thick enough to flatten these wirings is formed and then the common electrode 3 made of ITO film as transparent conductor is formed.

The line width w1' of the electrode portions 3a, 3d of the common electrode located right above the video signal line 5 is set larger than the line width w1 of the electrode portions 3b, 3c of another common electrode.

Thereafter, the alignment layers 9A, 9B made of polyimide or the like to align molecules of the liquid crystal 2 are respectively formed on the array substrate 1A and the opposed substrate 1B.

The counter substrate 1B is provided opposite to the array substrate 1A, and is provided with the red color filter material 10a, the green color filter material 10b, the blue color filter material 10c, and the black matrix 11 to have a predetermined pattern.

The array substrate 1A and the opposed substrate 1B so created respectively are treated such that initial predetermined orientation directions are formed therein and peripheral portion thereof are bonded using a sealing agent, followed by filling the liquid crystal 2 for sealing.

The semiconductor switching element 7 is on/off-controlled by a drive signal input through the video signal line 5 and the scanning signal line 6. A voltage is applied across the pixel electrode 4 connected to the semiconductor switching element 7 and the common electrode 3 to generate an electric field, thereby changing the orientation of the liquid crystal 2 to thereby control luminances of respective pixels. Thus, an image is displayed.

In FIG. 17, d denotes cell gap, w1 denotes line width of the electrode portion 3b of the common electrode, w2 denotes line width of the electrode portion 4a of the pixel electrode, w1' denotes line width of the electrode portion 3a of the common electrode, 1 denotes spacing (gap) between the electrode portion 3b of the common electrode and the electrode portion 4a of the pixel electrode.

In this embodiment, as shown in FIG. 17, the line width w1 of the electrode portion 3b of the common electrode and the line width w2 of the electrode portion 4a of the pixel electrode are set smaller than the cell gap d (w1, w2<d) and the spacing (gap) 1 is smaller than the cell gap (1<d). The pixel electrode 4 is formed in a process before forming the transparent insulating layer 8, that is, the pixel electrode 4 is provided on the side of the array substrate 1A as a lower layer of a transparent resin layer 8.

The line width w1' of the common electrodes 3a, 3d located right above the video signal line 5 are larger than the line width w1 of the common electrodes 3b, 3d (w1'>w1). In these respects, this embodiment is different from those of the conventional examples.

Such a constitution allows the electric field strength over the electrodes to be increased by an electric field around the respective electrodes as well as the lateral electric field, thereby Ell causing the liquid crystal to be rotated. So, the transparent conductive material for the electrodes allows the light over the electrodes to be transmitted therethrough.

Moreover, since the common electrode 3a is provided above the video signal line 5, an electric field can be also generated between the common electrode 3a and the pixel electrode 4a. Accordingly, light is transmitted through a portion conventionally covered by the black matrix 11 and thereby substantial improvement of the aperture ratio is achieved. As a result, a high-luminance panel is obtained.

However, in this constitution, the electric field distribution varies depending on what layer the common electrode 3 and the pixel electrode 4 are formed in.

Initially, function and effects in the case where the pixel electrode 4 is formed in: the process before forming the transparent insulating layer 8, that is, the pixel electrode 4 is formed on the array substrate 1A as the lower layer of the transparent resin layer 8, will be explained.

Figure 18:
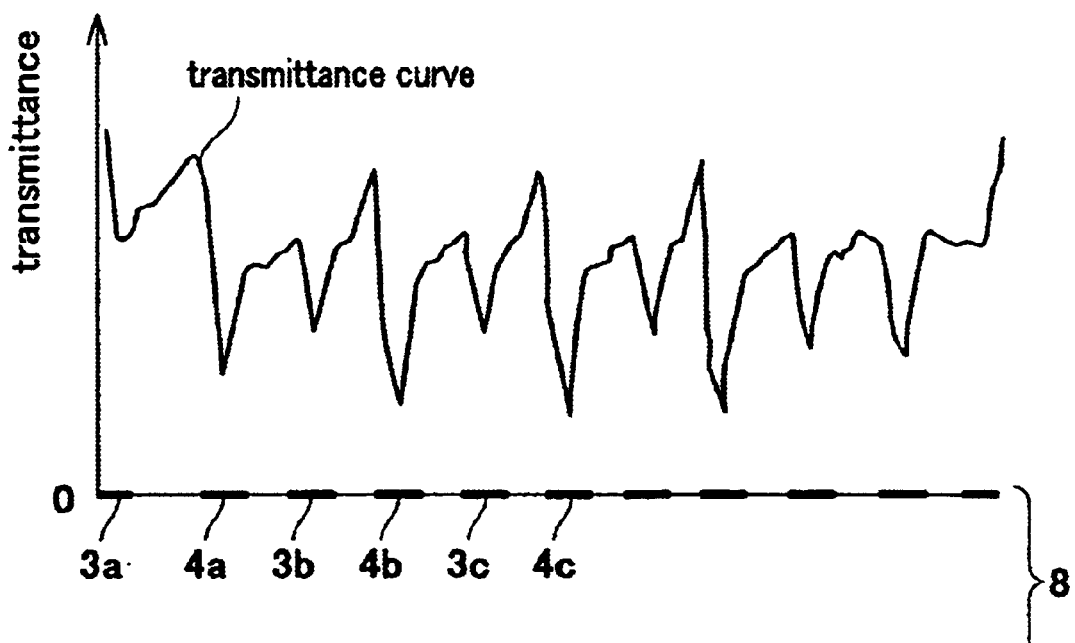
FIGS. 18(a)–FIG. 18(b) are views showing a light transmittance characteristic of the liquid crystal display according to the embodiment 2-5.
Figure 18:
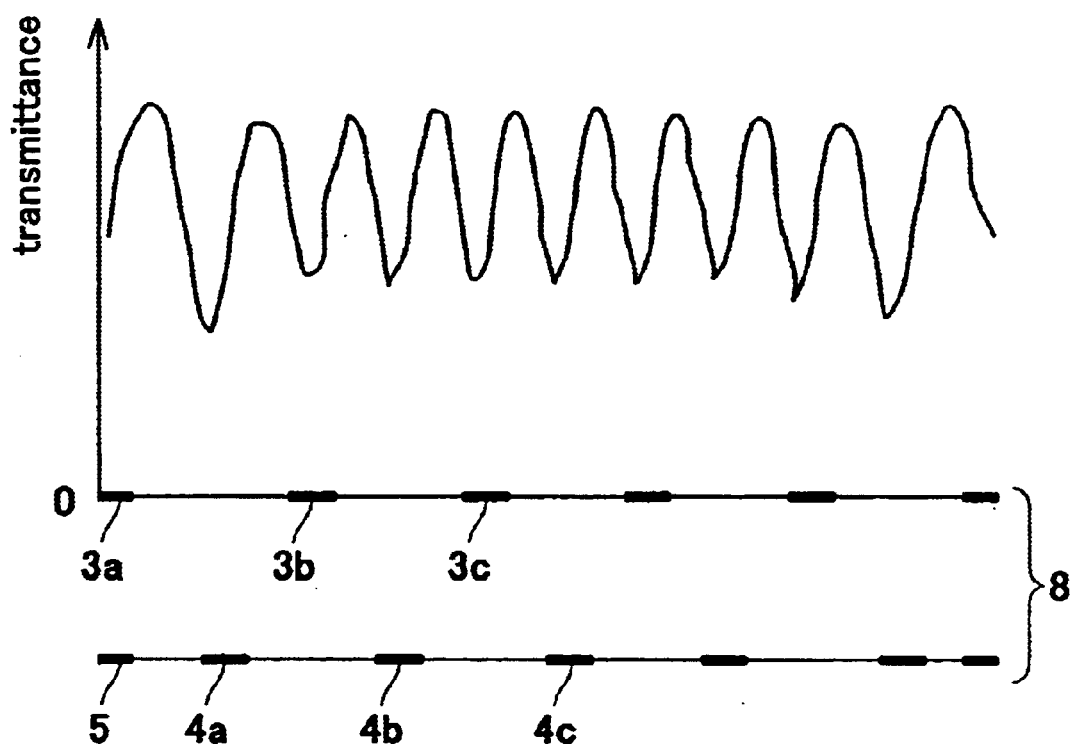

FIG. 18 shows a light transmittance characteristic (light transmittance of the panel is calculated from the electric field distribution and liquid crystal director) in the electrode constitution of this embodiment.

Specifically, electrode gap 1 is 2 $\mu$m, electrode width w1=w2 is 2 $\mu$m, and cell gap d is 4 $\mu$m (that is, w1, w2<d, and 1<d are satisfied). Other than the electrode constitution, the same conditions, that is, the same liquid crystal material, the drive voltage of 5V, and the same environment, are employed.

The difference between the constitution of FIG. 18(a) and the constitution of FIG. 18(b) is that in the constitution of FIG. 18(a), the common electrode 3 and the pixel electrode 4 are formed in the upper layer of the transparent insulating layer 8, that is, on the side of the opposed substrate 1B, while in the constitution of FIG. 18(b), the pixel electrode 4 is formed in the process before forming the transparent insulating layer 8, that is, the pixel electrode 4 is provided on the side of the array substrate 1A as the lower layer of the transparent resin layer 8.

The results show that the constitution of FIG. 18(b) has higher transmittance. The measurement of transmittance in ultra-high definition panel having one dot size of 43 $\mu$m×129 $\mu$m is that transmittance in the constitution without a layered common electrode is 37%, and transmittance in the constitution of FIG. 18(a) is 44%, while transmittance in the constitution of FIG. 18(c) is greatly improved, i.e., 60%.

Subsequently, function and effects in the case where the line width w1' of the common electrode 3a located right above the video signal line 5 is set larger than the line width w1 of the common electrode 3b (w1'>w1).

Figure 19:
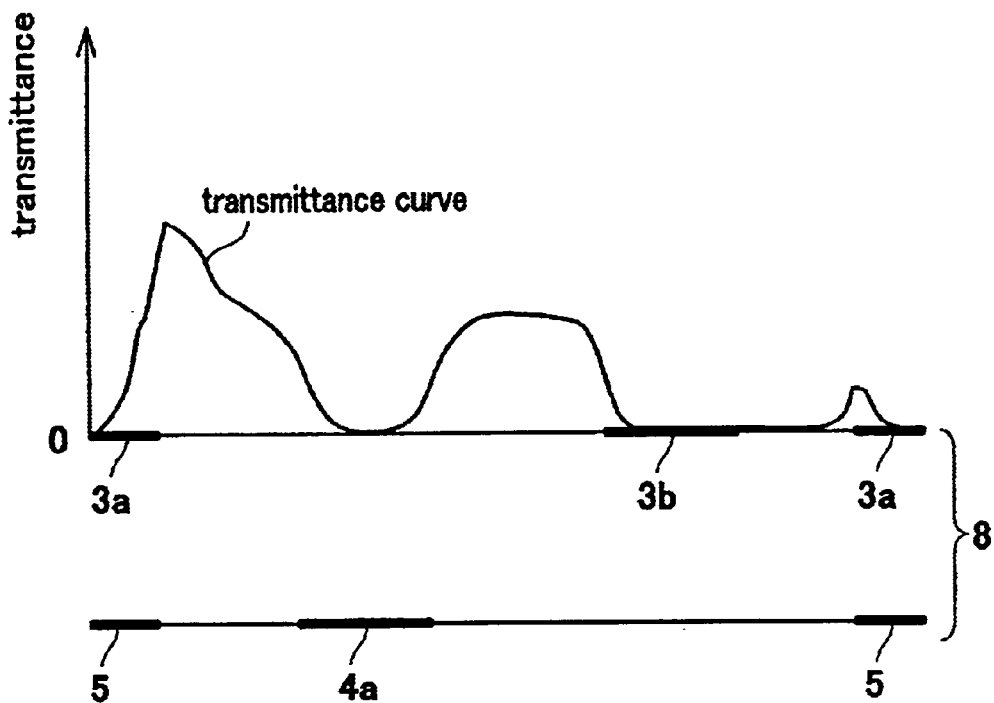
FIGS. 19(a)–FIG. 19(b) are views showing a light transmittance characteristic of the liquid crystal display according to the embodiment 2-5.
Figure 19:
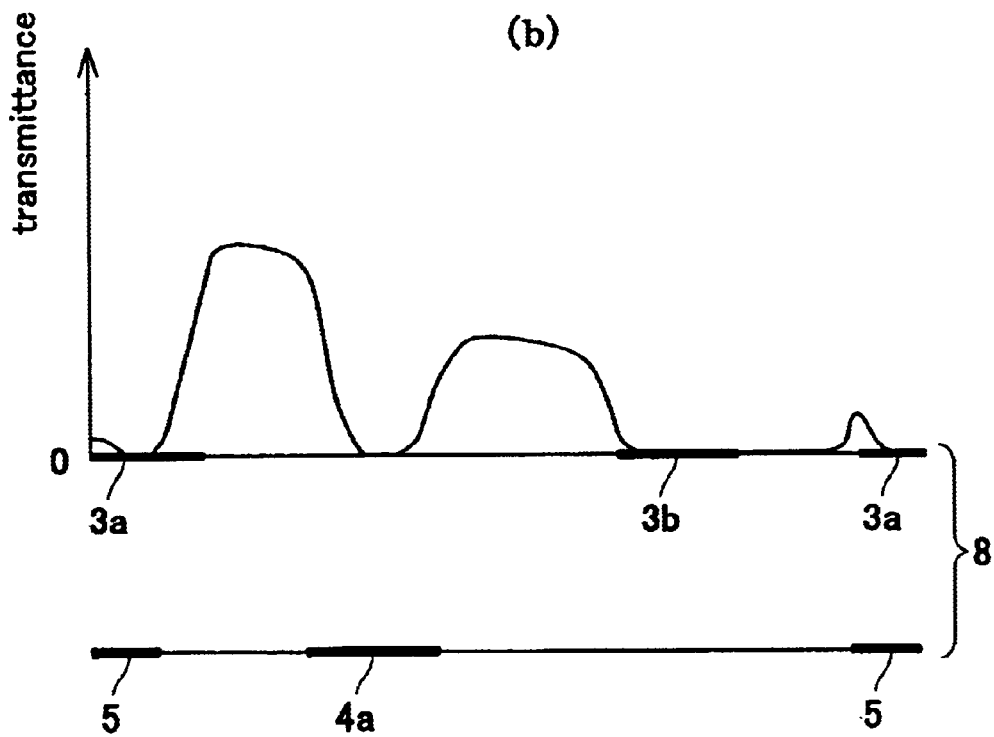

FIG. 19 shows results of electro-optics simulation (panel transmittance is calculated from the electric field distribution and liquid crystal director) in the case of the electrode constitution different in electrode line width and electrode spacing from that of FIG. 18(b).

Specifically, electrode gap 1 is 10 m, electrode width w1=w2 are 6 m, and cell gap d is 4 m. Other than the electrode constitution, the same conditions, that is, the same liquid crystal material, the drive voltage of 5V, and the same environment, are employed. As shown in FIG. 19(a), in the case of w1'=w1=6 m, the electric field generated between the common electrode 3a located right above the video signal line 5 and the pixel electrode 4a differs from the electric field generated between the pixel electrode 4a and the common electrode 3b and all inclined distribution in which the electric field becomes stronger as it is close to the video signal line 5. Correspondingly, in the transmittance distribution, the transmittance is higher as it is closer to the video signal line 5. So, luminance unevenness or coloring is caused.

On the other hand, as shown in FIG. 19(b), by setting the line width of the common electrode 3a located tight above the video signal line 5 larger than the line width of another common electrode (W1'=10 m>w1), there is no inclination in the electric field distribution generated between the common electrode 3a located right above the video signal line 5 and the pixel electrode 4a. Therefore, the occurrence of luminance unevenness and coloring can be prevented. In the constitution of this embodiment, w1, w2<d and 1<d are not satisfied. In the constitution that satisfies w1, w2<d and 1<d, the same effects can be prevented.

(Embodiment 2-6)

FIG. 20(a) is a cross-sectional view showing a constitution of a liquid crystal display according to an embodiment 2-6. FIG. 20(b) is a plan view showing a constitution of a liquid crystal display according to the embodiment 2-6. FIG. 20(c) is a cross-sectional view taken substantially along A—A of FIG. 20(b).

Figure 20:
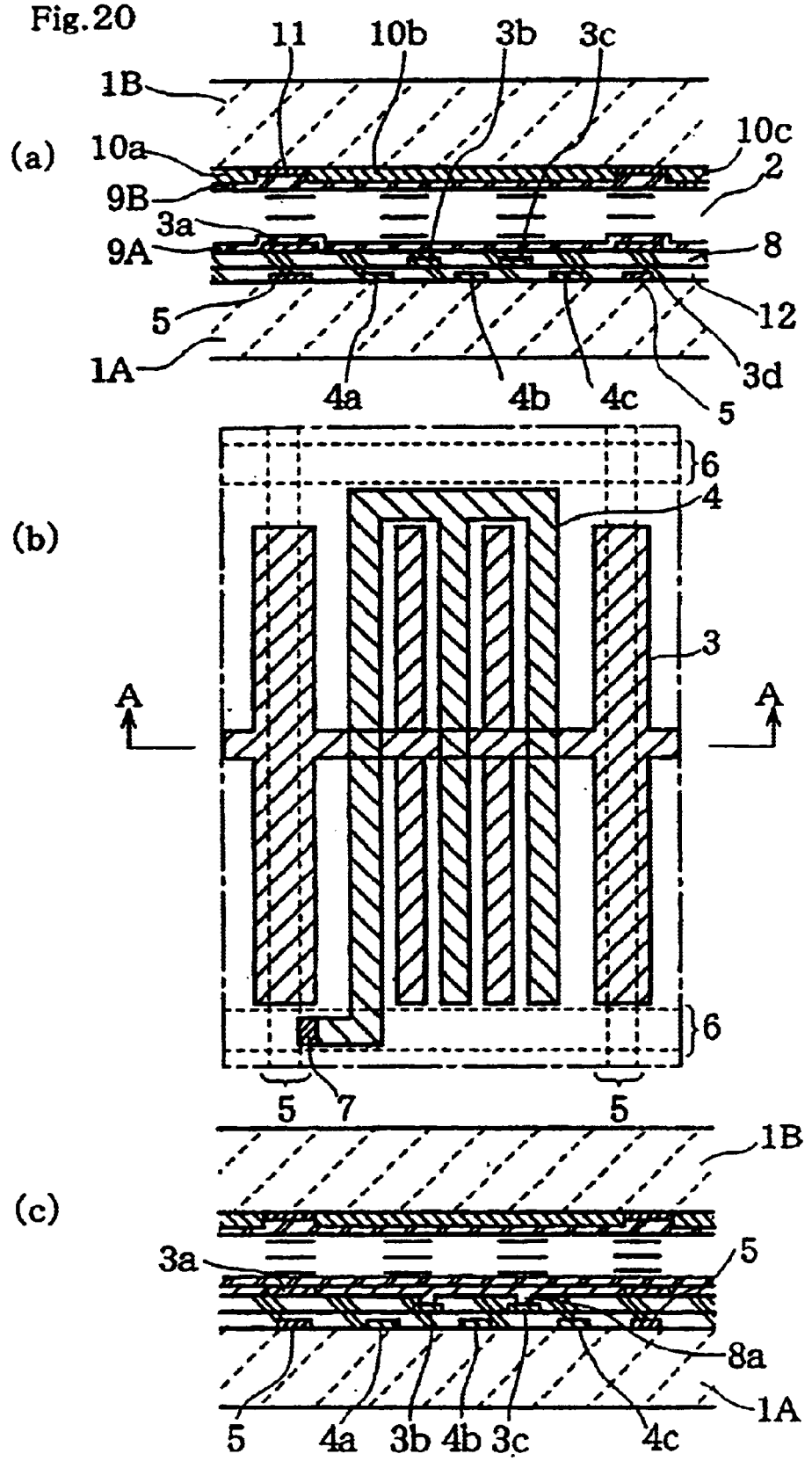

In FIG. 20, 1A denotes an array substrate, 1B denotes an opposed substrate, 2 denotes liquid crystal, 3 denotes a common electrode, 4 denotes a pixel electrode, 5 denotes a video signal line connected to the pixel electrode 4 for supplying a video signal, 6 denotes a scanning signal line, 7 denotes semiconductor switching element, 8 denotes a transparent insulating layer, 9A denotes an alignment layer formed on an inner surface of the array substrate 1A, 9B denotes an alignment layer formed on an inner surface of the opposed substrate 1B, 10a denotes a red color filter material, 10b denotes a green color filter material, 10c denotes a blue color filter material, 11 denotes a black matrix (mask layer), and 12 denotes an insulating layer formed in a step of fabricating the semiconductor switching element 7.

In this embodiment, the layer in which the common electrodes 3a, 3d located right above the video signal line 5 are formed and the layer in which the common electrodes 3b, 3c are formed differ from each other and a high-resistance conductor such as ITO cannot be formed right above the video signal line 5.

Since die fabrication method of the embodiment 2-6 is almost the same as the embodiment 2-5, a different process will be explained. Specifically, the process for forming the common electrode 3 will be explained.

Similarly to the embodiment 2-5, the common electrode 3 and the pixel electrode 4 are patterned in comb shape as shown in FIG. 20(b) using ITO film as a transparent conductor or a conductive film made of Al, Ti, or the like.

The pixel electrode 4 is formed in the same layer as the video signal line 5, the scanning signal line 6, or the semiconductor switching element 7 using ITO film or the like as a transparent conductor.

Subsequently, the insulating layer 12 is formed in the step of fabricating the semiconductor switching element 7 and then the common electrodes 3b, 3c are formed using ITO films as the transparent conductors.

Further, the transparent insulating layer 8 thick enough to flatten these wirings is formed, and the common electrodes 3a, 3d are formed using a non-transparent conductive material such as Al, Cr, or the like. The common electrodes 3a, 3d located right above the video signal line 5 and the other common electrodes 3b, 3c are electrically conductive through a contact hole 8a provided in the transparent insulating layer 8.

In this constitution, since the video signal line 5 is originally made of a non-transparent material such as Al, the common electrodes 3a, 3d located right above the video signal line 5 can be formed using non-transparent low-resistance conductive material such as Al, Cr, or the like without reducing transmittance.

(Embodiment 2-7)

An embodiment 2-7 of this embodiment will be described with reference to Figures.

Figure 21:
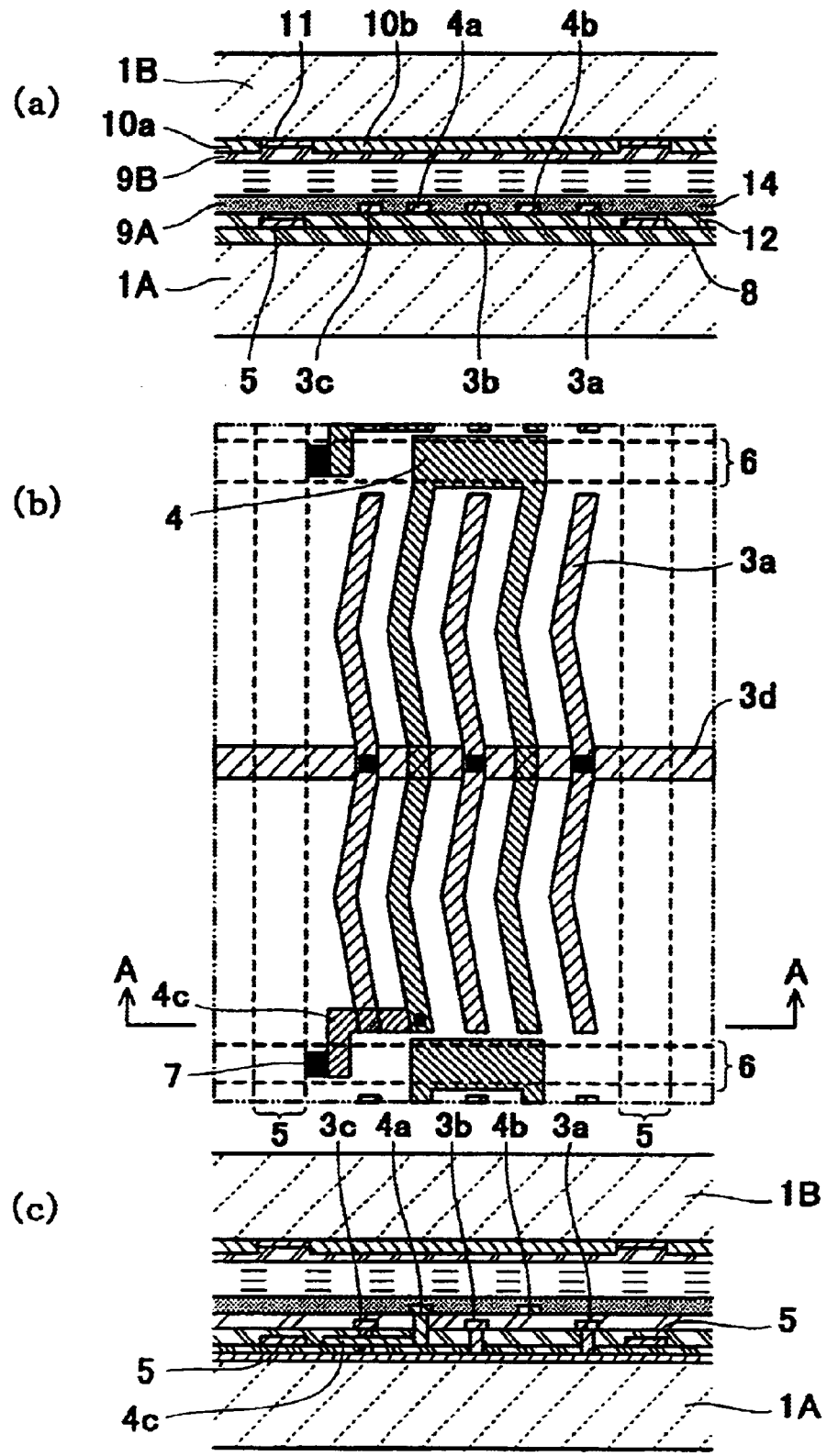

FIG. 21(a) is a cross-sectional view showing a constitution of a liquid crystal display according to an embodiment 2-7. FIG. 21(b) is a plan view showing a constitution of a liquid crystal display according to the embodiment 2-7. FIG. 21(c) is a cross-sectional view showing a constitution of a liquid crystal display according to the embodiment 2-7 and a cross-sectional view taken substantially along A—A of FIG. 21(b).

Figure 22:
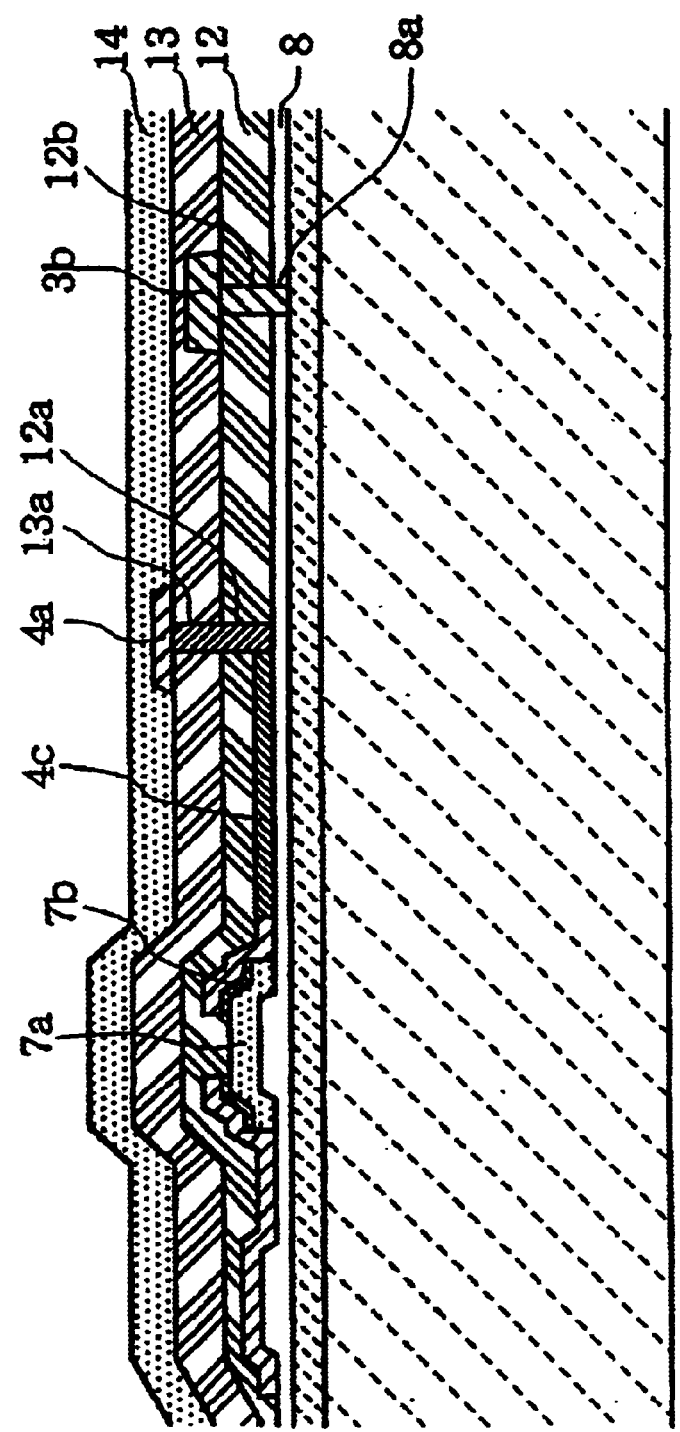
FIG. 22 is an enlarged cross-sectional view showing a constitution of a semiconductor switching element of the liquid crystal display according to the embodiment 2-7 and its vicinity.
Figure 23:
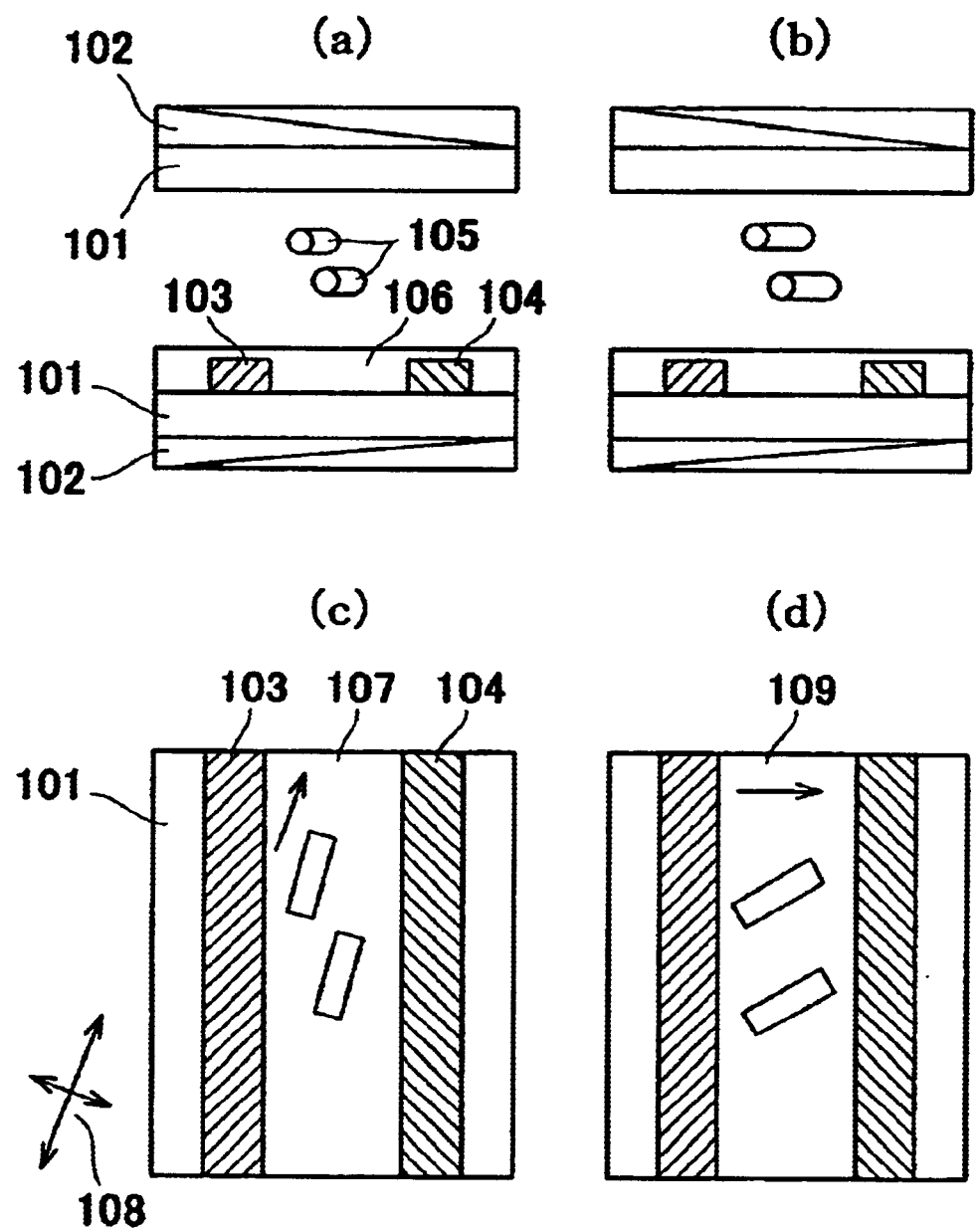
FIGS. 23(a)–FIG. 23(d) are views showing a constitution of the first conventional liquid crystal display.
Figure 24:
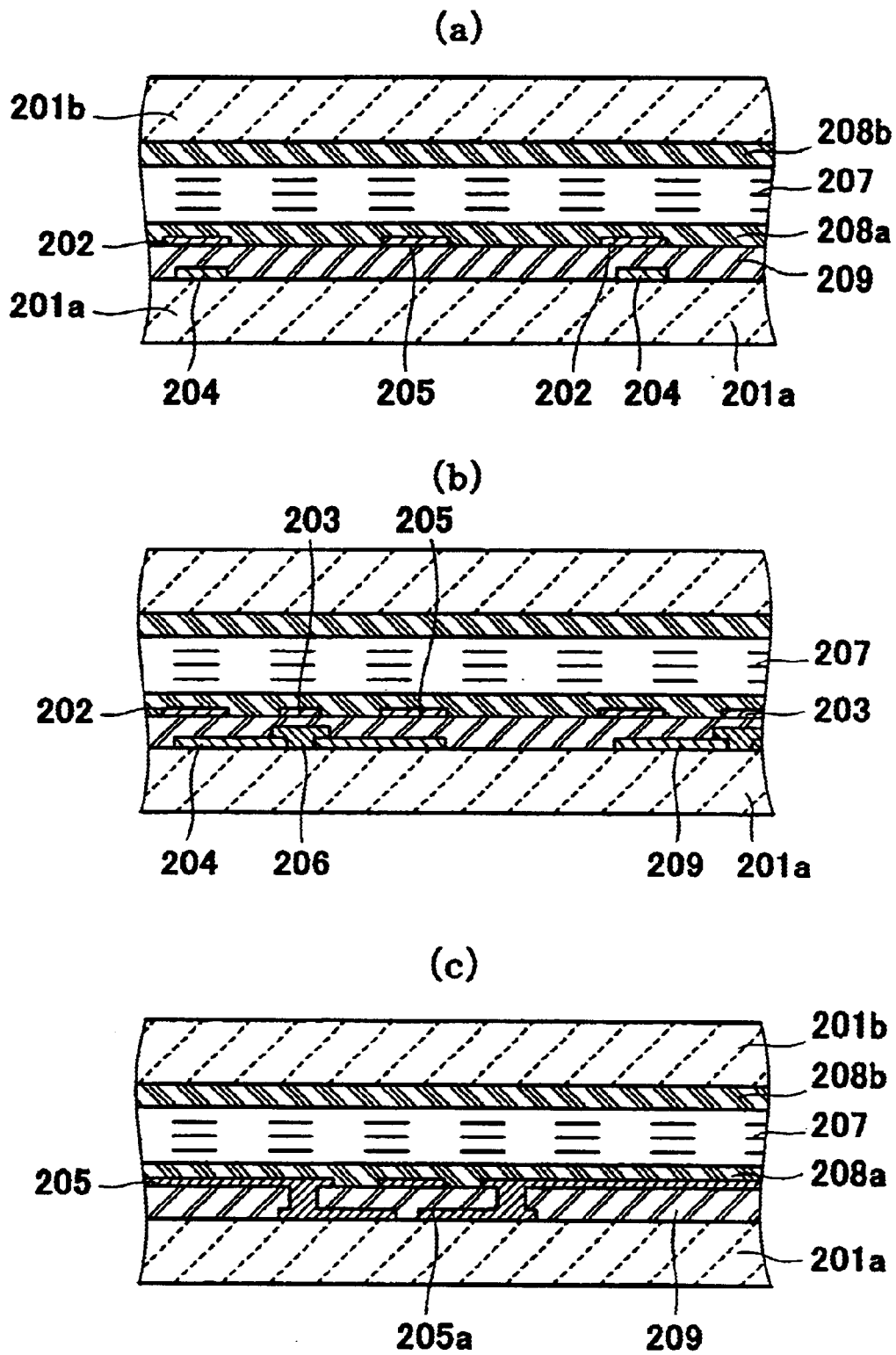
FIGS. 24(a)–FIG. 24(c) are views showing a constitution of the second conventional liquid crystal display.

FIG. 22 is an enlarged cross-sectional view showing a constitution of a semiconductor switching element of the liquid crystal display according to the embodiment 2-7 of the present invention and its vicinity.

The constitution of this embodiment differs from those of the embodiments 2-1 to 2-4 in that the liquid crystal material includes a great deal of impurity ions, and a residual image caused by accumulation of charges thereof over the electrodes, that is, image persistence is noticeable.

Since the fabrication method of the embodiment 2-7 is almost identical to that of the embodiment 2-3, only a different process will be described. Specifically, a process for adding a fourth insulating layer 14 and effects thereof will be explained.

Similarly to the embodiment 2-3, the process of forming the third insulating layer 13 made of SiNx or the like and thereafter, forming the electrode portions 4a, 4b of the pixel electrode using ITO films as transparent conductors and its preceding process, are performed. In this embodiment, further, a fourth insulating layer 14 is formed.

The constitution of the embodiments 2-1 to 2-4 are that the electrode portions 3a, 3b of the common electrode or the electrode portions 4a, 4b of the pixel electrode are exposed in the uppermost layer. Specifically, since the alignment layer 9A is very thin, the liquid crystal 2 is substantially in direct contact with the exposed electrode portion, thereby causing accumulation of the impurity ions in the liquid crystal 2. As a result, flicker, the residual image, image persistence occurs. Therefore, in particular, when the liquid crystal 2 includes a great deal impurity ions, the flicker, the residual image, becomes noticeable. This might damage an image quality and induce a chemical reaction under high-temperature and humid environment, which might result in further image defect.

Accordingly, to prevent the liquid crystal 2 from being in direct contact with the electrode portions 3a, 3b of the common electrode or the electrode portions 4a, 4b of the pixel electrode, a fourth insulating layer 14 is provided.

The fourth insulating layer may be any of the insulating films described in the embodiments 2-1 to 2-6. That is, by using insulating film made of SiNx used in another process or made of acrylic-based photosensitive resin or the like used as an inter-layer insulating film or the like, a liquid crystal with high image quality and high reliability is obtained at a low cost without adding a fabricating device.

It should be noted that a surface resistance is preferably about $10^{10}$ Ω/□ and a film thickness is preferably 50 nm or more.

Also, the use of $SiO_2$-based material containing $Sb_2O_5$-based fine particles for the fourth insulating layer is more effective, because this material has a function of absorbing impurity ions such as $Na^+$, $K^+NH_4^+$.

Industrial Applicability

As should be understood from the foregoing description, each objective of the present invention is satisfactorily achieved. Specifically, the followings are achieved:

(1) Since it is not necessary to reduce the cell gap, time required for filling the liquid crystal is not long, and high speed can be achieved without unevenness due to precision variation in gap.

(2) Since it is not necessary to change a liquid crystal material or an addition ratio thereof, high speed can be achieved without causing display defect such as partial abnormality of contrast or flicker due to reduction of heat resistance, light resistance or the like.

(3) Since it is not necessary to increase the drive voltage, high speed can be achieved without an increase in consumed power and using the conventional drive IC.

(4) High speed can be achieved without reducing transmittance.

(5) Since it is possible to provide a liquid crystal display with wide viewing angle, and high image quality such as high speed response and high luminance with the above-described function, industrial value is extremely high.

(6) By forming the electrode portions of the pixel electrode and the counter electrode using transparent conductive layers and using the combination of the electrode constitution and liquid crystal material for increasing the electric field strength over the electrodes, a liquid crystal panel with high aperture ratio capable of modulating liquid crystal molecules over the electrodes to transmit light is obtained.

(7) Since the layer in which the gate electrode (scanning signal line) is formed and the layer in which the counter electrode is formed differ from each other, electric shortening between the gate electrode and the counter electrode can be significantly reduced.

(8) Since the electrodes are placed in light of effects of the layered common electrode located right above the video signal line on the electric field distribution, high transmittance is obtained as a whole.

(9) By setting the line width of the common electrode right above the video signal line larger than the line width of another common electrode, a transmittance distribution in which transmittance between the common electrode right above the video signal line and the pixel electrode varies gently, a uniform image without luminance unevenness and coloring can be obtained.

(10) As should be understood from the foregoing, since it is possible to provide a liquid crystal display with wide viewing angle, and high image quality without luminance unevenness, coloring, or the like, industrial value is extremely high.

What is claimed is:

1. A liquid crystal display comprising an array substrate in which a common electrodes, a pixel electrode, a scanning signal line, a video signal line and a semiconductor switching element are formed, an opposed substrate, and a liquid crystal layer interposed between the array substrate an the opposed substrate, wherein a voltage is applied across the pixel electrode and the common electrode to generate an electric field substantially parallel to the substrates to thereby drive the liquid crystal to control light, characterized in that line width of at least one of the common electrode and the pixel electrode is larger than gap between the common electrode and the pixel electrode, and film thickness of at least one of the common electrode and the pixel electrode is larger than film thickness of at least one of the scanning signal line and the video signal line, wherein at least one of the common electrode and the pixel electrode is comprised of at least two types of conductive layers and has a convex cross section, wherein at least one of the common electrode and the pixel electrode is comprised of transparent conductors having at least two types of different optical characteristics and having different wavelengths which respectively result in preferable transmittances.

2. The liquid crystal display according to claim 1 wherein at least one of the common electrode and the pixel electrode is comprised of a transparent insulating layer and a transparent conductive layer formed on a surface thereof.

3. A liquid crystal display comprising an array substrate in which a common electrode, a pixel electrode, a scanning signal line, a video signal line, and a semiconductor switching element are formed, an opposed substrate, and a liquid crystal layer interposed between the array substrate and the opposed substrate, wherein a voltage is applied across the pixel electrode and the common electrode to generate an electric field substantially parallel to the substrates to thereby drive the liquid crystal to control light, characterized in that:

the common electrode is comprised of a wiring portion and electrode portions comprised of transparent conductive layers, and the electrode portions of the common electrode are formed in a layer different from layer in which the video signal line is formed with a first insulating layer interposed therebetween, and the pixel electrode is formed in a layer different from layers in which the video signal line and the electrode portions of the common electrode are respectively formed with second insulating layer interposed between the pixel electrode and video signal line or electrode portions of the common electrode, wherein line widths of the electrode portions comprised of transparent conductive layers differ from one another unlike electrode portions comprised of non-transparent conductive layers when these electrode portions are comprised of the non-transparent conductive layers.

4. The liquid crystal display according to claim 3, wherein line widths of the electrode portions comprised of transparent conductive layers are larger than line widths of the electrode portions comprised of non-transparent conductive layers when these electrode portions are comprised of the non-transparent conductive layers.

5. A liquid crystal display comprising array substrate in which a common electrode, a pixel electrode, a scanning signal line, a video signal line, and a semiconductor switching element are formed, an opposed substrate, and a liquid crystal layer interposed between the array substrate and the opposed substrate, wherein a voltage is applied across the pixel electrode and the common electrode to generate an electric field substantially parallel to the substrates to thereby drive the liquid crystal to control light, characterized in that:

the common electrode is comprised of a wiling portion and electrode portions comprised of transparent conductive layers, and the electrode portions of the common electrode are formed in a layer different from a layer in which the video signal line is formed with a first insulating layer interposed therebetween, and the pixel electrode is formed in a layer different from layers in which the video signal line and the electrode portions of the common electrode are respectively, formed with a second insulating layer interposed between the pixel electrode and video signal line or electrode portions of the common electrode, wherein bend elastic constant K33 of a liquid crystal material of the liquid crystal layer is 18(pN) or less.

6. A method for fabricating a liquid crystal display, comprising the steps of:

forming a non-transparent conductor on an active matrix substrate and patterning a first electrode group comprised of part of or all of a common electrode and a scanning signal line to have a predetermined shape;

forming a first insulating layer on the active matrix substrate having the first electrode group;

forming a semiconductor layer on a predetermined portion of the first insulating layer;

forming a non-transparent conductor on the first insulating layer and the semiconductor layer and patterning a second electrode group comprised of part of or all of a video signal line and a pixel electrode to have a predetermined shape;

forming a second insulating layer on the active matrix substrate that has been subjected to the step of forming the second electrode group and its previous steps;

forming a transparent conductor on the second insulating layer and patterning a third electrode group comprised of part of the common electrode and/or part of the pixel electrode to have a predetermined shape; and forming a third insulating layer subsequent to a step of forming the third electrode group to have the predetermined pattern;

wherein the third insulating layer is made of $SiO_2$-based material; and the $SiO_2$-based material contains $Sb_2O_5$-based fine particles.

* * * * *